(12) United States Patent
Hallam

(10) Patent No.: US 12,006,156 B1
(45) Date of Patent: Jun. 11, 2024

(54) SYSTEMS AND METHODS FOR HEAT PROCESSING

(71) Applicant: COG ENGINEERING INC., Yucca Valley, CA (US)

(72) Inventor: Gregg Hallam, Yucca Valley, CA (US)

(73) Assignee: COG Engineering Inc., Yucca Valley, CA (US)

(*) Notice: Subject to any disclaimer, the term of this patent is extended or adjusted under 35 U.S.C. 154(b) by 0 days.

(21) Appl. No.: 18/433,222

(22) Filed: Feb. 5, 2024

Related U.S. Application Data

(60) Provisional application No. 63/443,704, filed on Feb. 6, 2023.

(51) Int. Cl.
| | |
|---|---|
| B65G 17/42 | (2006.01) |
| B65G 15/42 | (2006.01) |
| B65G 17/06 | (2006.01) |
| B65G 17/34 | (2006.01) |
| B65G 17/40 | (2006.01) |
| B65G 17/46 | (2006.01) |

(52) U.S. Cl.
CPC ........... *B65G 17/42* (2013.01); *B65G 17/067* (2013.01); *B65G 17/34* (2013.01); *B65G 17/40* (2013.01); *B65G 17/46* (2013.01); *B65G 15/42* (2013.01)

(58) Field of Classification Search
CPC ...... B65G 17/42; B65G 17/067; B65G 17/34; B65G 17/40; B65G 17/46; B65G 15/42
USPC ...................................................... 198/699.1
See application file for complete search history.

(56) References Cited

U.S. PATENT DOCUMENTS

| | | | | |
|---|---|---|---|---|
| 1,872,629 | A | * | 8/1932 | Fahrenwald ............. C23D 9/00 432/239 |
| 5,101,966 | A | * | 4/1992 | Lapeyre ................. B65G 17/08 198/803.14 |
| 5,951,929 | A | | 9/1999 | Wilson |

(Continued)

OTHER PUBLICATIONS

Cathmaster™ HS-900 Catheter Laminator brochure (1 page). Available in public event Aug. 10, 2021.

*Primary Examiner* — Mark A Deuble
(74) *Attorney, Agent, or Firm* — BLAIR WALKER IP SERVICES, LLC

(57) ABSTRACT

A machine for processing tubing includes a chamber, a heater, a conveyor belt that passes through an interior space of the chamber, each of twenty or more links of the conveyor belt further comprising a generally planar outer-facing surface, each adjacent to a generally planar outer-facing surface of at least one other link, forming a generally planar composite surface along a substantially linear sub-path, and wherein a first link and a second link each comprises a first longitudinally-extending barricade adjacent a first side and a second longitudinally-extending barricade adjacent a second side of the at least one generally planar outer-facing surface, the barricades separated by a transverse distance that is less than one-half of the width of the conveyor belt, and wherein when the first and second link are in the substantially linear sub-path, a distance between the distal end of the first link and the proximal end of the second link is less than a total length of the substantially linear sub-path, such that an elongate member resting on and extending along the generally planar composite surface is transversely restricted from migrating more than one-half of the width of the conveyor belt.

30 Claims, 16 Drawing Sheets

(56) References Cited

U.S. PATENT DOCUMENTS

| | | | | |
|---|---|---|---|---|
| 6,079,543 | A * | 6/2000 | Palmaer | B65G 17/08 |
| | | | | 198/445 |
| 6,103,037 | A | 8/2000 | Wilson | |
| 10,583,989 | B2 * | 3/2020 | Heil | B65G 17/46 |
| 2002/0046962 | A1 * | 4/2002 | Vallans | A61B 50/362 |
| | | | | 206/370 |
| 2006/0076218 | A1 * | 4/2006 | Marshall | B66B 23/12 |
| | | | | 198/853 |
| 2006/0118389 | A1 * | 6/2006 | Henley | B65G 17/08 |
| | | | | 198/853 |
| 2008/0314720 | A1 * | 12/2008 | Guldenfels | B65G 17/08 |
| | | | | 198/853 |
| 2023/0339689 | A1 * | 10/2023 | Hösl | B65G 35/06 |
| 2023/0356950 | A1 * | 11/2023 | Kocaman | B65G 17/08 |

* cited by examiner

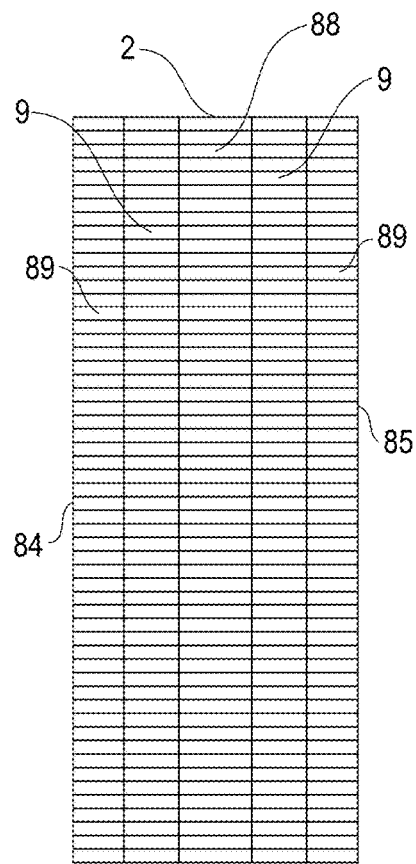
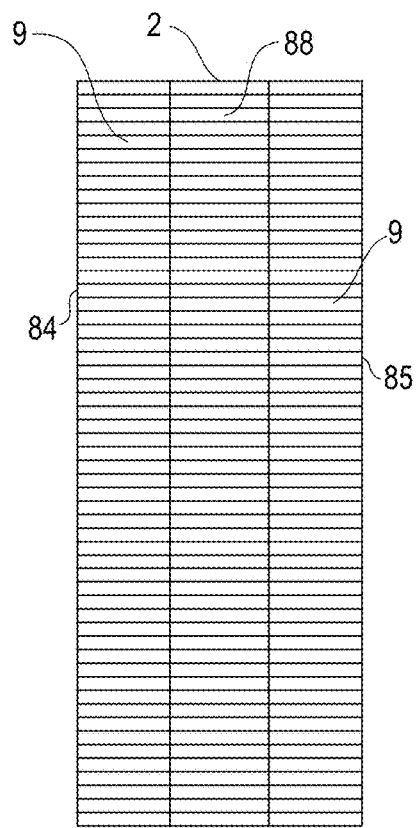
FIG. 5C　　　　　　　　　FIG. 5D
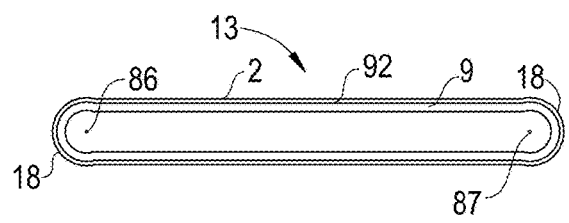
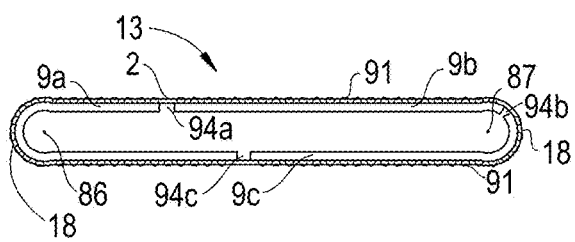
FIG. 5E　　　　　　　　　FIG. 5F

SYSTEMS AND METHODS FOR HEAT PROCESSING

INCORPORATION BY REFERENCE TO ANY PRIORITY APPLICATIONS

This application claims the benefit of priority to U.S. Provisional Patent Application No. 63/443,704, filed on Feb. 6, 2023, which is incorporated by reference herein in its entirety for all purposes. Priority is claimed pursuant to 35 U.S.C. § 119.

BACKGROUND OF THE INVENTION

Field of the Invention

The field of the invention generally relates to processes for making or assembling catheters or hollow probes. This includes methods or apparatus for the working of plastics, including laminating (e.g., tubes) characterized by the heating method and/or the cooling method.

SUMMARY OF THE INVENTION

In one embodiment of the present disclosure, a machine for processing tubing includes a chamber having an outer structure and an interior space, a heating device configured to add thermal energy within the interior space of the chamber, a continuous belt including twenty or more links and configured to translate in a 360 degree path that includes a substantially linear sub-path that passes through the interior space of the chamber and that includes a changing subset of the twenty or more links as the belt translates, each of the twenty or more links including a distal end and a proximal end, the distal end of each of the twenty of more links rotatably coupled to a proximal end of a distal adjacent link at a first rotatable coupling and the proximal end of each of the twenty of more links rotatably coupled to a distal end of a proximal adjacent link at a second rotatable coupling, wherein the first rotatable coupling rotates about a first axis that is generally transverse to the 360 degree path, and wherein the second rotatable coupling rotates about a second axis that is generally transverse to the 360 degree path, each of the twenty or more links further including at least one generally planar outer-facing surface extending from the distal end to the proximal end, such that, at least one generally planar outer-facing surface of each link of the substantially linear sub-path is adjacent to a generally planar outer-facing surface of at least one other link of the substantially linear sub-path, causing a continuous generally planar linked surface to be maintained along the substantially linear sub-path as the belt translates in the 360 degree path, and at least one engagement portion disposed on the belt at or adjacent the continuous generally planar linked surface, the at least one engagement portion configured to engage an elongate member to be processed within the interior space of the chamber such that translation of the belt in the 360 degree path causes the at least one engagement portion, when it is engaged with the elongate member, to move the elongate member through the interior space of the chamber.

In another embodiment of the present disclosure, a machine for processing tubing includes a chamber having an outer structure and an interior space, a heating device configured to add thermal energy within the interior space of the chamber, a continuous belt including twenty or more links, the belt having a width and configured to translate in a 360 degree path that includes a substantially linear sub-path that passes through the interior space of the chamber and that includes a changing subset of the twenty or more links as the belt translates, each of the twenty or more links including a distal end and a proximal end, the distal end of each of the twenty of more links rotatably coupled to a proximal end of a distal adjacent link at a first rotatable coupling and the proximal end of each of the twenty of more links rotatably coupled to a distal end of a proximal adjacent link at a second rotatable coupling, wherein the first rotatable coupling rotates about a first axis that is generally transverse to the 360 degree path, and wherein the second rotatable coupling rotates about a second axis that is generally transverse to the 360 degree path, each of the twenty or more links further including at least one generally planar outer-facing surface extending from the distal end to the proximal end, such that, at least one generally planar outer-facing surface of each link of the substantially linear sub-path is adjacent to a generally planar outer-facing surface of at least one other link of the substantially linear sub-path, causing a continuous generally planar linked surface to be maintained along the substantially linear sub-path as the belt translates in the 360 degree path, and wherein a first link of the twenty or more links includes a first longitudinally-extending barricade including one or more substantially vertical projection adjacent a first side of the at least one generally planar outer-facing surface and a second longitudinally-extending barricade including one or more substantially vertical projection adjacent a second side of the at least one generally planar outer-facing surface, the first longitudinally-extending barricade of the first link transversely separated from the second longitudinally-extending barricade of the first link by a transverse distance that is less than one-half of the width of the belt, and wherein a second link of the twenty or more links includes a first longitudinally-extending barricade including one or more substantially vertical projection adjacent a first side of the at least one generally planar outer-facing surface and a second longitudinally-extending barricade including one or more substantially vertical projection adjacent a second side of the at least one generally planar outer-facing surface, the first longitudinally-extending barricade of the second link transversely separated from the second longitudinally-extending barricade of the second link by a transverse distance that is less than one-half of the width of the belt, wherein when the belt is in a translated position such that the first link and the second link are both included in the changing subset of the twenty or more links of the substantially linear sub-path, a distance between the distal end of the first link and the proximal end of the second link is less than a total length of the substantially linear sub-path, such that an elongate member resting on and extending along the continuous generally planar linked surface, between the first longitudinally-extending barricade and the second longitudinally-extending barricade of the first link of the twenty or more links and between the first longitudinally-extending barricade and the second longitudinally-extending barricade of the second link of the twenty or more links, is transversely restricted from migrating more than one-half of the width of the belt.

In yet another embodiment of the present disclosure, a machine for processing tubing includes a chamber having an outer structure and an interior space, a heating device configured to add thermal energy within the interior space of the chamber, a continuous belt including fifty or more links, the belt having a width and configured to translate in a 360 degree path that includes a substantially linear sub-path that passes through the interior space of the chamber and that includes a changing subset of the fifty or more links as the belt translates, each of the fifty or more links including a distal end and a proximal end, the distal end of each of the fifty of more links rotatably coupled to a proximal end of a distal adjacent link at a first rotatable coupling and the proximal end of each of the fifty of more links rotatably coupled to a distal end of a proximal adjacent link at a second rotatable coupling, wherein the first rotatable coupling rotates about a first axis that is generally transverse to the 360 degree path, and wherein the second rotatable coupling rotates about a second axis that is generally transverse to the 360 degree path, wherein the changing subset of the fifty or more links of the substantially linear sub-path define at least one outer-facing surface platform extending from the distal end to the proximal end, such that, at least one outer-facing platform of each link of the substantially linear sub-path is adjacent to an outer-facing platform of at least one other link of the substantially linear sub-path, causing a longitudinally elongated platform to be maintained along the substantially linear sub-path as the belt translates in the 360 degree path, and wherein a first link of the fifty or more links includes one or more substantially vertical projection adjacent a first side of the at least one outer-facing platform and one or more substantially vertical projection adjacent a second side of the at least one outer-facing platform, the at least one outer-facing platform having a width that is less than one-half of the width of the belt, wherein a second link of the fifty or more links includes one or more substantially vertical projection adjacent a first side of the at least one outer-facing platform and one or more substantially vertical projection adjacent a second side of the at least one outer-facing platform, wherein when the belt is in a translated position such that the first link and the second link are both included in the changing subset of the fifty or more links of the substantially linear sub-path, a distance between the distal end of the first link and the proximal end of the second link is less than a total length of the substantially linear sub-path, such that an elongate member resting on and extending along the longitudinally elongated platform, between the one or more substantially vertical projection adjacent the first side of the at least one outer-facing platform and the one or more substantially vertical projection adjacent the second side of the at least one outer-facing platform of the first link, and between the one or more substantially vertical projection adjacent the first side of the at least one outer-facing platform and the one or more substantially vertical projection adjacent the second side of the at least one outer-facing platform of the second link, is transversely restricted from migrating more than one-half of the width of the belt.

In still another embodiment of the present disclosure, a machine for processing tubing includes a chamber having an outer structure and an interior space, a heating device configured to add thermal energy within the interior space of the chamber, a continuous belt including fifty or more wire links, the belt having a width and configured to translate in a 360 degree path that includes a substantially linear sub-path that passes through the interior space of the chamber and that includes a changing subset of the fifty or more links as the belt translates, each of the fifty or more links including a distal end and a proximal end, the distal end of each of the fifty of more links rotatably coupled to a proximal end of a distal adjacent link at a first rotatable coupling and the proximal end of each of the fifty of more links rotatably coupled to a distal end of a proximal adjacent link at a second rotatable coupling, wherein the first rotatable coupling rotates about a first axis that is generally transverse to the 360 degree path, and wherein the second rotatable coupling rotates about a second axis that is generally transverse to the 360 degree path, wherein the changing subset of the fifty or more links of the substantially linear sub-path define at least one outer-facing surface platform extending from the distal end to the proximal end, such that, at least one outer-facing platform of each link of the substantially linear sub-path is adjacent to an outer-facing platform of at least one other link of the substantially linear sub-path, causing a longitudinally elongated platform to be maintained along the substantially linear sub-path as the belt translates in the 360 degree path, a first substantially vertical projection formed on one of the fifty or more wire links and located adjacent a first side of the at least one outer-facing platform, a second substantially vertical projection formed on one of the fifty or more wire links and adjacent a second side of the at least one outer-facing platform, a third substantially vertical projection formed on one of the fifty or more wire links and located adjacent the first side of the at least one outer-facing platform, a fourth substantially vertical projection formed on one of the fifty or more wire links and adjacent the second side of the at least one outer-facing platform, wherein the at least one outer-facing platform has a width that is less than one-half of the width of the belt, wherein when the belt is in a translated position such that the first wire link and the second wire link are both included in the changing subset of the fifty or more wire links of the substantially linear sub-path, a distance between the distal end of the first wire link and the proximal end of the second wire link is less than a total length of the substantially linear sub-path, such that an elongate member resting on and extending along the longitudinally elongated platform, between the first and third substantially vertical projections adjacent the first side of the at least one outer-facing platform and the second and fourth substantially vertical projections adjacent the second side of the at least one outer-facing platform, is transversely restricted from migrating more than one-half of the width of the belt.

In yet another embodiment of the present disclosure, a machine for processing tubing includes a chamber having an outer structure and an interior space, the chamber having a length, a heating device configured to add thermal energy within the interior space of the chamber, a continuous belt including twenty or more links and configured to translate in a 360 degree path that includes a substantially linear sub-path that passes through the interior space of the chamber and that includes a changing subset of the twenty or more links as the belt translates, each of the twenty or more links including a distal end and a proximal end, the distal end of each of the twenty of more links rotatably coupled to a proximal end of a distal adjacent link at a first rotatable coupling and the proximal end of each of the twenty of more links rotatably coupled to a distal end of a proximal adjacent link at a second rotatable coupling, wherein the first rotatable coupling rotates about a first axis that is generally transverse to the 360 degree path, and wherein the second rotatable coupling rotates about a second axis that is generally transverse to the 360 degree path, each of the twenty or more links further including at least one generally planar outer-facing surface extending from the distal end to the proximal end, such that, at least one generally planar outer-facing surface of each link of the substantially linear sub-path is adjacent to a generally planar outer-facing surface of at least one other link of the substantially linear sub-path, causing a first continuous generally planar linked surface to be maintained along the substantially linear sub-path as the belt translates in the 360 degree path, the first continuous generally planar linked surface configured for placement of an elongate member, a second continuous generally planar linked surface formed on an inner-facing portion of the belt, opposite the first continuous generally planar linked surface, and a first elongate longitudinal support extending a first longitudinal distance that is at least one-half of the length of the chamber, the first elongate longitudinal support having a generally linear top extreme configured to support the belt at the second continuous generally planar linked surface along the substantially linear sub-path, such that the belt is maintained in a substantially planar condition while being translated along the substantially linear sub-path within the chamber.

In still another embodiment of the present disclosure, a machine for processing tubing includes a chamber having an outer structure and an interior space, a heater configured to add thermal energy to the interior space of the chamber, a conveyor belt including twenty or more links, the conveyor belt having a width and configured to translate in a 360° path that includes a substantially linear sub-path that passes through the interior space of the chamber and that includes a changing subset of the twenty or more links as the conveyor belt translates, each of the twenty or more links including a distal end and a proximal end, each of the twenty of more links pivotably coupled in relation to a distal adjacent link and in relation to a proximal adjacent link, wherein each of the twenty or more links is configured to rotate about an axis that is generally transverse to the 360° path, each of the twenty or more links further including a generally planar outer-facing surface extending from the distal end to the proximal end, such that, the generally planar outer-facing surface of each link of the substantially linear sub-path is adjacent to a generally planar outer-facing surface of at least one other link of the substantially linear sub-path, causing a generally planar composite surface to be maintained along the substantially linear sub-path as the conveyor belt translates in the 360° path, and wherein a first link of the twenty or more links includes a first longitudinally-extending barricade adjacent a first side of the at least one generally planar outer-facing surface of the first link and a second longitudinally-extending barricade adjacent a second side of the at least one generally planar outer-facing surface of the first link, the first longitudinally-extending barricade of the first link transversely separated from the second longitudinally-extending barricade of the first link by a transverse distance that is less than one-half of the width of the conveyor belt, wherein a second link of the twenty or more links includes a first longitudinally-extending barricade adjacent a first side of the at least one generally planar outer-facing surface of the second link and a second longitudinally-extending barricade adjacent a second side of the at least one generally planar outer-facing surface of the second link, the first longitudinally-extending barricade of the second link transversely separated from the second longitudinally-extending barricade of the second link by a transverse distance that is less than one-half of the width of the conveyor belt, and wherein when the conveyor belt is in a translated position such that the first link and the second link are both included in the changing subset of the twenty or more links of the substantially linear sub-path, a distance between the distal end of the first link and the proximal end of the second link is less than a total length of the substantially linear sub-path, such that an elongate member resting on and extending along the generally planar composite surface, between the first longitudinally-extending barricade and the second longitudinally-extending barricade of the first link of the twenty or more links and between the first longitudinally-extending barricade and the second longitudinally-extending barricade of the second link of the twenty or more links is transversely restricted from migrating more than one-half of the width of the conveyor belt.

In yet another embodiment of the present disclosure, a method for heat processing catheter assemblies includes providing a heat processing system including a chamber having an interior, a heater configured to add thermal energy to the interior, a longitudinal conveyor system configured to pass through the chamber, and a motor configured to translate the longitudinal conveyor system, placing one or more catheter assemblies on the longitudinal conveyor system of the heat processing system, operating the heater of the heat processing system to increase the temperature within a chamber of the heat processing system through which the longitudinal conveyor system is configured to pass, and moving the one or more catheter assemblies through the interior of the chamber with the longitudinal conveyor system while physically restricting the movement of the one or more catheter assemblies to one-half or less than the width of the longitudinal conveyor system.

BRIEF DESCRIPTION OF THE DRAWINGS

FIG. 5C is a plan view of a belt of the heat processing system, according to an embodiment of the present disclosure.

FIG. 5D is a plan view of a belt of the heat processing system, according to an embodiment of the present disclosure.

FIG. 5E is a side view of a belt of the heat processing system, according to an embodiment of the present disclosure.

FIG. 5F is a side view of a belt of the heat processing system, according to an embodiment of the present disclosure.

DETAILED DESCRIPTION OF THE ILLUSTRATED EMBODIMENTS

Figure 1:
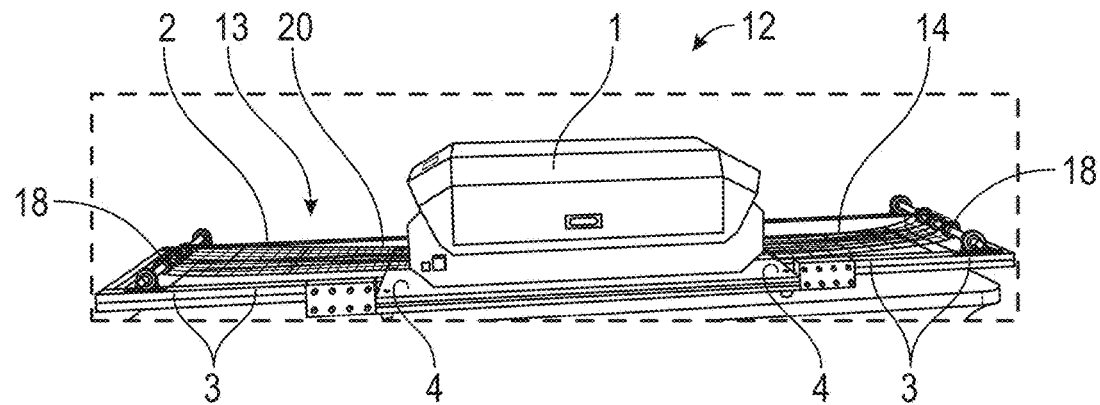
FIG. 1 is a perspective view of a heat processing system, according to an embodiment of the present disclosure.

The present disclosure generally relates to equipment and processes for making or assembling catheters or hollow probes, or for making or assembling coated probes with or without lumens. The assembly process generally utilizes a conveyorized machine to thermally create one or more layer or lamination on elongate shafts, such as shafts for use in the manufacture of medical catheters or probes.

Catheters can be manufactured in some embodiments by the following steps: (A) sliding various thermoplastic extrusions whose lumen(s) have one or more inserted mandrels, for example, Teflon coated mandrels; (B) sliding heat shrink tubing over the extrusions; (C) heating the entirety of the assembly to an elevated temperature, to shrink the heat shrink tubing, and thus melt the extrusions and compress their material radially down onto the mandrels; (D) cooling the reflowed (e.g., melted) assembly; (E) cutting off or otherwise removing the heat shrink tubing; (F) extracting the mandrels to leave a single continuous composite tubular structure. Step C (heating the entirety of the assembly to an elevated temperature) can be performed in some embodiments by one or more of the following processes: (i) placing the assembly into a large oven for a period of time (this is a batch process); (ii) hanging the assembly in a vertical orientation (e.g., from a clip or clamp) and applying heat from a cylindrical, inward-facing nozzle of hot air while moving the nozzle slowly from one end of the device to the other; (iii) suspending the assembly in a horizontal orientation with clips or clamps and traversing the part with hot air from one end to the other; (iv) suspending the assembly vertically (as in ii) or horizontally (as in iii) traversing a heated metal die over the assembly. Process iv can, for example, be done using radiant heat, such as one or more infrared heater. Or, it can be done with convective heating, conductive heating, or inductive heating. Radiofrequency induction can be used to heat certain polymer materials. Electromagnetic induction to heat metal mandrels or metal sleeves (and thus heat the polymeric materials) can also be utilized.

In apparatus and methods described herein, a continuously moving conveyor belt travels through an oven/heated chamber. Any type of heating device can be used, to add thermal energy to the interior space of the heating chamber. The heat in the interior space of the chamber (e.g., having a temperature that is above external ambient temperature) will then be able to apply heat to the processed parts or materials. Parts do not have to be clipped or mounted and the part moves in a controlled manner through the heated chamber. Some advantages of the teachings herein will become apparent, they include:

- A continuous conveyor (e.g., conveyor belt) through a relatively long, heated chamber.
- A low-profile entrance to the heating chamber, to accommodate one or more catheters/assemblies, with minimal heat loss, high efficiency, thermal stability.
- Utilization of an open mesh metal (e.g., stainless steel) wire belt with a pattern of ridges to allow for effective heat transfer to the part and the ridges to prevent catheters/assemblies from rolling off belt. In alternative embodiments, a perforated metal chain belt can be utilized.
- The system has options for various lengths of belt extensions to accommodate the lengths of various catheter products (e.g., outside of the chamber, including both pre-chamber and post-chamber, which are also known as the loading zone and the unloading zone, and which are also known as inlet and outlet).
- An open chamber with a uniform temperature distribution and/or that is capable of applying uniform heat, to allow processing of various diameter catheters without the need to change out heating systems (e.g., heater nozzles or dies).
- A cooling zone at the exit of the conveyor to remove heat from the assembly and to reduce the temperature of the previously-heated assembly, and to thus allow for immediate handling of assembly/ies.

Conveyor linear speeds are variable from about 10 mm/min to about 900 mm/min to allow optimization of product quality and throughput. Conveyor can be translatable via a motor powered by A/C or D/C electricity, wired, or battery (e.g., rechargeable batteries).

A ten inch (254 mm)-wide belt allows several catheters/assemblies to be run through the chamber simultaneously, and loaded at any time individually.

A double-decker "nested" configuration to increase product throughput without increasing machine footprint.

A multi-zone design with independent control settings to maintain highly stable temperatures throughout, or to control multiple heat segments, each having a different temperature.

·A built-in thermocouple (or multiple thermocouples, RTVs or other temperature sensors) (e.g., within the chamber) for process temperature profiling and graphing.

An alarm and a light (e.g., LED) configured to be activated by a controller (e.g., microprocessor) when set temperatures are reached, or when temperatures are not being maintained.

Heating recipe storage (and/or cooling recipe storage). Capability of recall for all speed and zone parameters.

A Continuous flow process running with the processing of one or more catheter/assembly at any time Eliminated need for clipping or suspending individual catheter assemblies.

Eliminated requirement for compressed air.

Drastically reduced burden on environment air conditioning.

Standard 110 VAC plug and electrical/power requirement, eliminating need for 220 VAC or other high voltage power. Although, 220 VAC (60 Hz or 50 Hz) embodiments can alternatively be produced.

Figure 2:
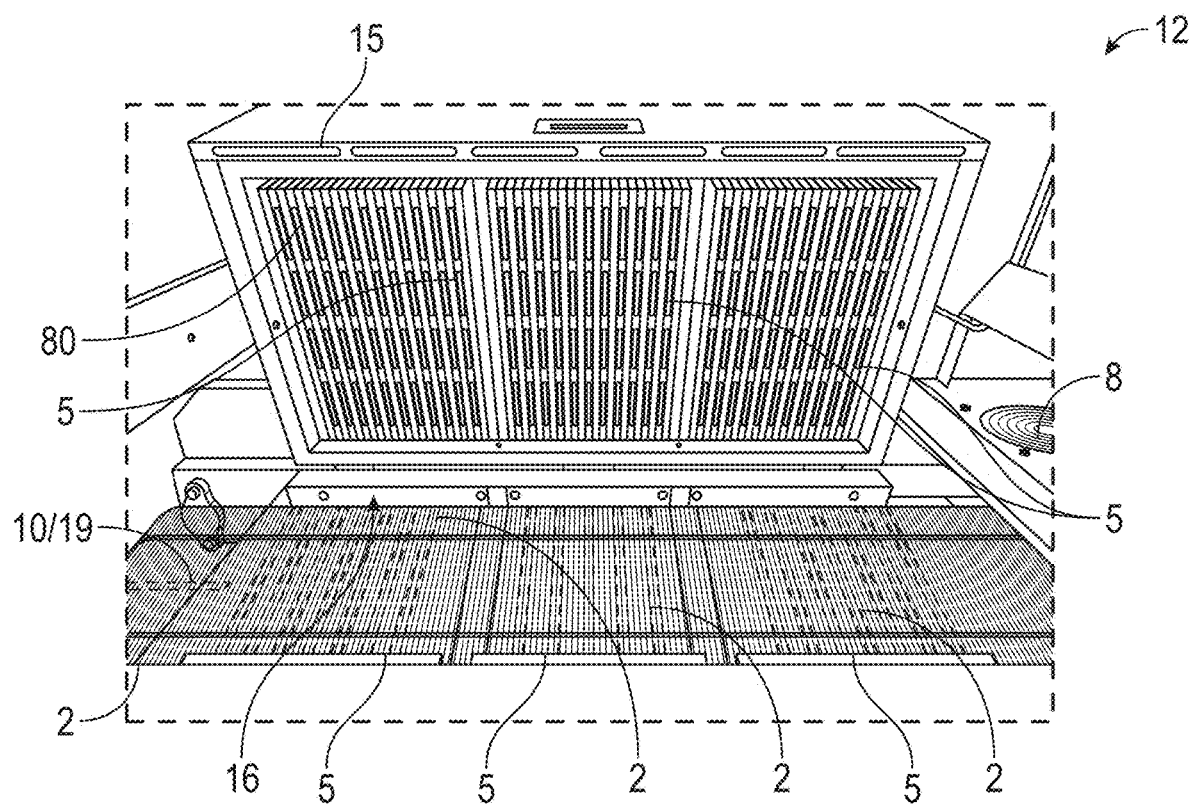
FIG. 2 is a perspective view of an opened heating chamber of the heat processing system of FIG. 1.
Figure 3:
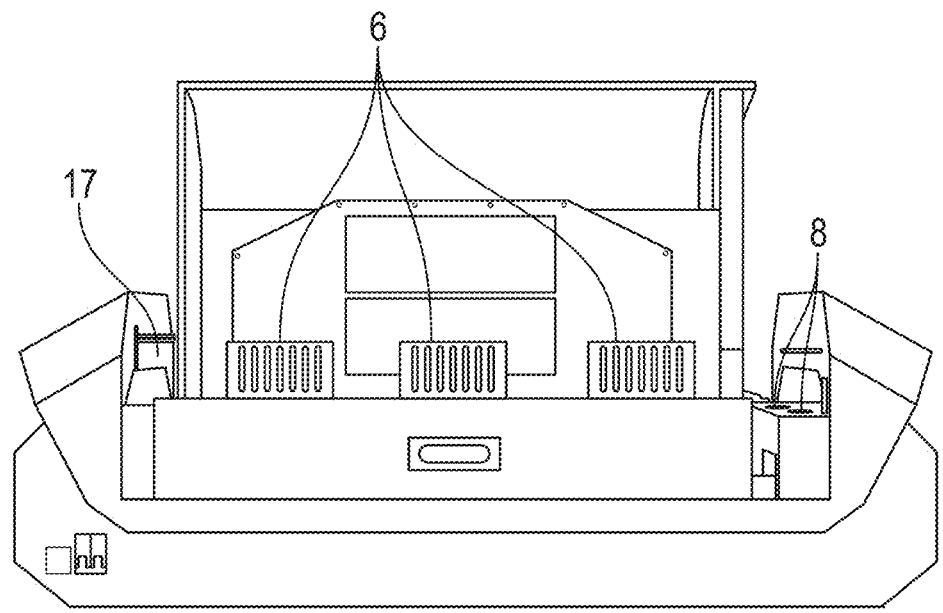
FIG. 3 is a side view of the heat processing system of FIG. 1 with an upper portion open.

Turning to FIG. 1, a heat processing system comprising a horizontal conveyorized heater system 12 for the controlled reflow of multi-material catheters is illustrated, and includes a loading zone 13 and an unloading zone 14. The system utilizes a heating chamber 1 mounted on a heating chamber chassis 4 with multiple heating platens 5 (FIG. 2) mounted above and below a conveyor wire belt 2. The wire belt 2 travels through the interior 16 of the heating chamber 1 supported from beneath by stainless steel guide rails 10 extending longitudinally inside the heating chamber 1. circulating fans 6 (FIG. 3) force air down through slits 80 in the upper individual heating platens 5 to heat the air within the interior 16 of the heating chamber 1. Conveyor extension modules 3, coupled adjacent the heating chamber 1, determine the inlet and exit conveyor length. Various length configurations of the conveyor extension modules 3 are available to accommodate the manufacturing of different lengths of catheters.

Figure 4:
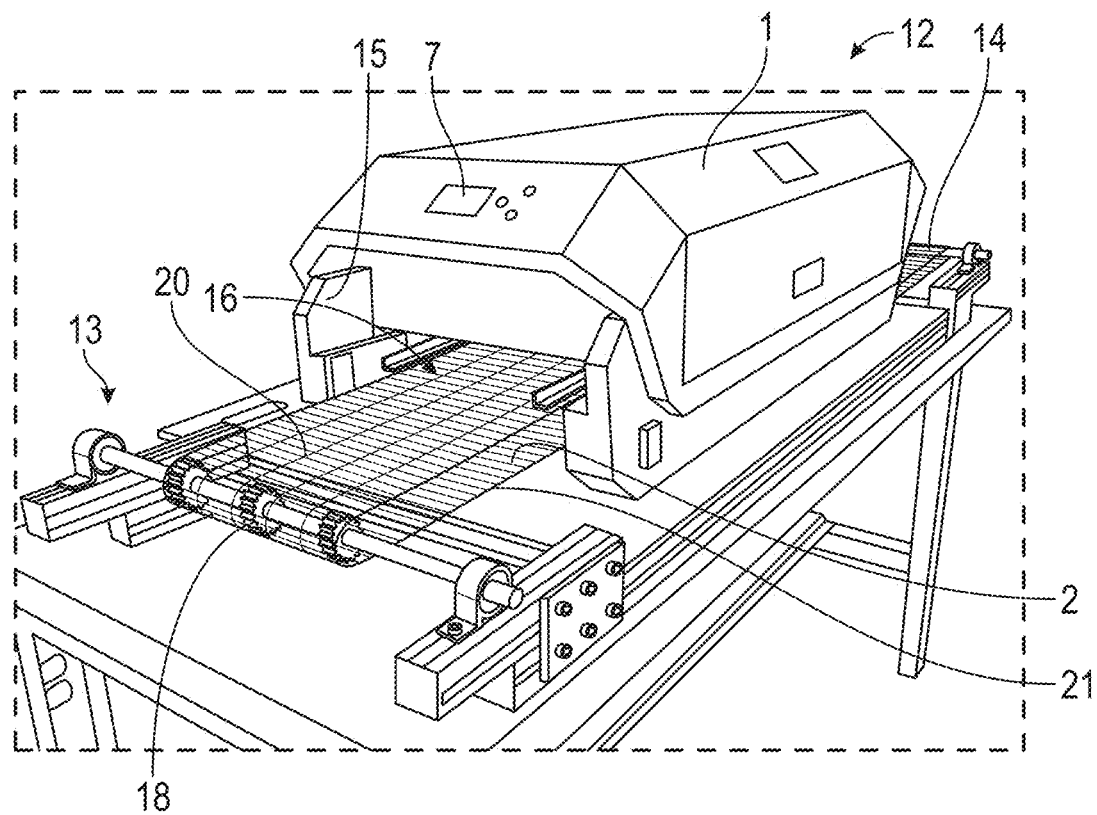
FIG. 4 is a perspective view of the heat processing system of FIG. 1.

A Control Panel 7 (FIG. 4), carried on the outer structure 15 of the chamber 1 allows an operator of the system 12 to select the set temperature of each heater platen 5 as well as the belt speed required to achieve proper catheter reflow (movement of the polymeric materials under heat, whether above melt temperature, or in some cases, simply above glass transition temperature). Settings can be saved as recipes which can be recalled for future use on the control panel 7. A controller 17 is carried on or in the outer structure 15 of the heating chamber 1, and is configured to control operations, make calculations, etc. The controller can comprise a microprocessor.

Catheters (e.g., catheter assemblies 33, FIGS. 7A-7B and 8) are placed longitudinally onto the wire belt 2 on the inlet side/loading zone 13 of the conveyor. In use, the control panel 7 is operated by an operator to cause a motor 81 (see FIG. 10) to move the wire belt 2; the wire belt 2 then carries the catheters through the heating chamber 1, heating the assembly(ies) 33 until the polymers melt and are contained and compressed by the heat shrink that is around the assembly (FIG. 7C). As catheter assemblies 33 pass out the exit end/unloading zone 14 of the heating chamber 1, they pass beneath cooling fans 8 (FIGS. 2-3) which help to remove heat to help solidify the melted polymers and to lower the overall temperature of the catheter assemblies 33 to allow operators to be able to handle the them quickly. The control panel 7 can be operated to instruct the controller 17 to adjust a speed of one or more of the cooling fans 8, thus adjusting the cooling rate (e.g., cooling power, or how much heat is removed from the interior 16 of the heating chamber 1, and/or from the unloading zone 14. The controller 17 can also be configured to change one or more temperature of the interior space 16 of the heating chamber 1, such as an overall temperature, an average temperature, or the temperature of one or more zones of the interior space 16. The wire belt 2 follows a 360 degree path in its complete cycle.

Figure 5A:
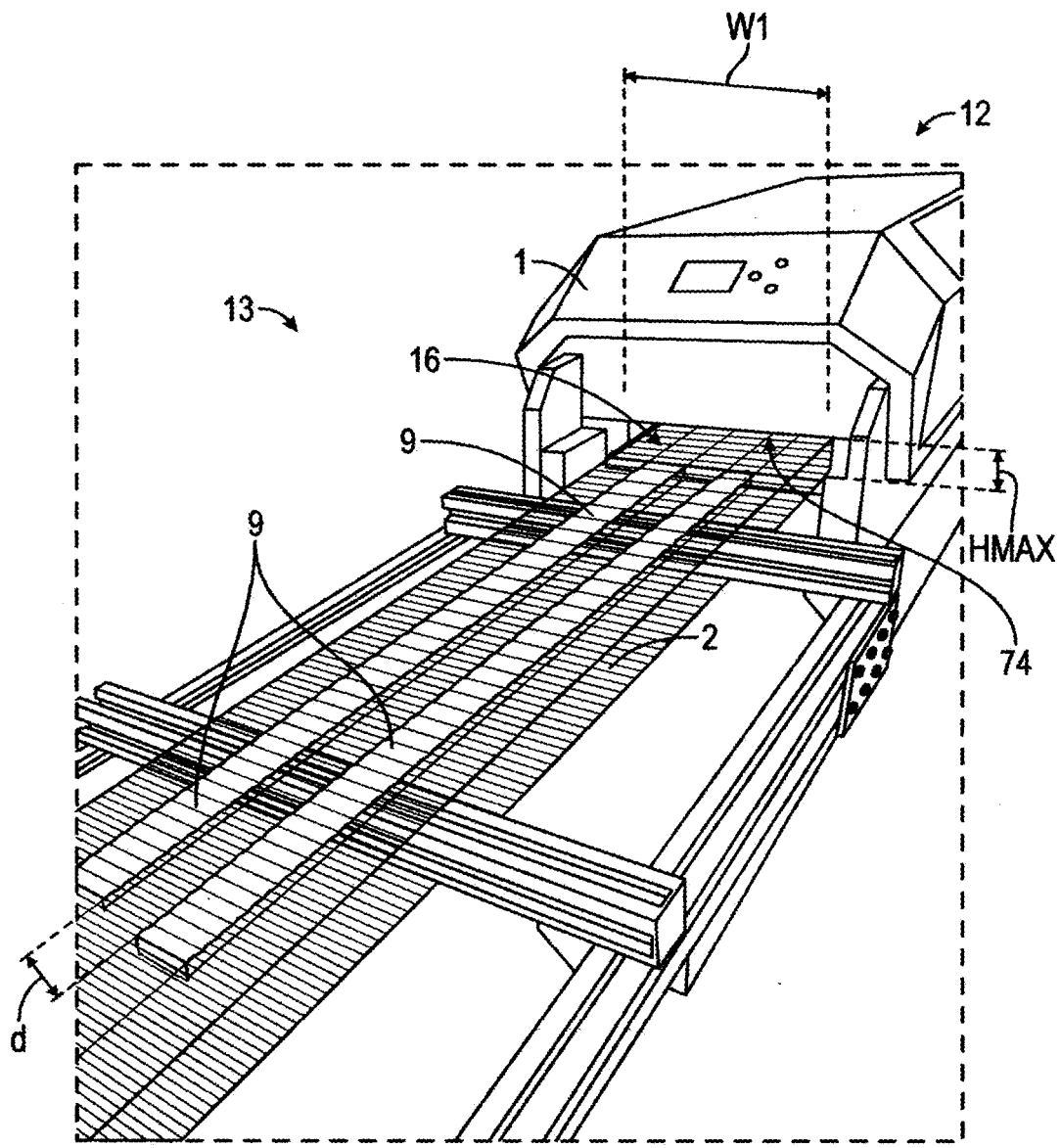
FIG. 5A is a perspective view of an alternative heat processing system, according to an embodiment of the present disclosure.
Figure 5B:
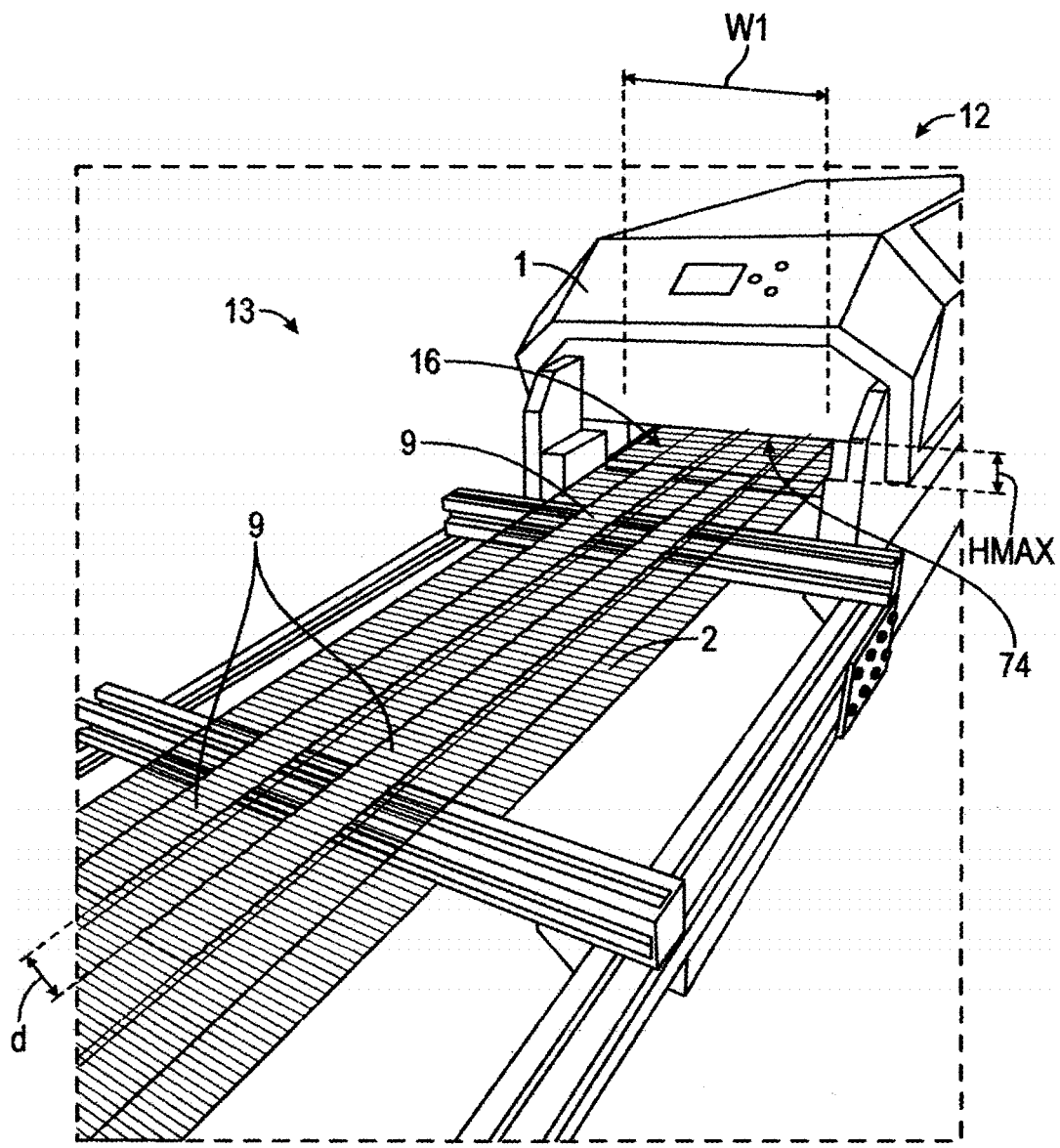
FIG. 5B is a perspective view of an alternative heat processing system, according to an embodiment of the present disclosure.

External to the heating chamber 1, the system incorporates belt support rails 9 comprising Delrin® (E.I. Du Pont De Nemours and Company, Wilmington, DE), or one or more other lubricious, non-toxic polymers, in combination with the wire belt 2, to support and/or stiffen the wire belt 2, thus maintaining a flat and level conveyor surface for the catheter assembly entering and exiting the interior 16 of the heating chamber 1. The belt support rails 9, being of a lubricious material, minimize wear and/or creation of particulate from the frictional rubbing between the material of the wire belt 2 and the material of the support rails 9, where attached, or where integrated. The belt support rails 9 are incorporated or integrated with the wire belt 2, and have a thickness that is thin enough to allow them to have enough flexibility to curve at the 180° end turns 18 of the wire belt 2, which maintaining enough rigidity of the belt to maintain a substantially planar top portion, at least when passing through the interior 16 of the chamber 1. In some embodiments, the entirety of each belt support rail 9 is attached to an underside of the wire belt 2, as shown in FIG. 5B and FIG. 5E. In some embodiments, the belt support rail 9 is interwoven between transverse wires/wire links of the wire belt 2, as shown in FIG. 5A and FIG. 5F. For example, every other wire (over-under-over, etc., as in FIG. 5A), or every second wire (over over-under under-over over, etc.), or every third wire, or more. The belt support rail 9 can be attached to the wire belt 2 with adhesive or epoxy 92 (FIG. 5E), or can be clamped or clipped or snapped in place, such as with interwoven portions or loops 91 in FIG. 5F.

FIG. 5C illustrates a pattern of two belt support rails 9 that is similar to that in the wire belts 2 in FIGS. 5A and 5B. A central open section 88 of the wire belt 2 is between the two belt support rails 9, and each of two outer open sections 89 are on the outside of each of the two belt support rails 9. FIG. 5C illustrates an alternative pattern of the wire belt 2 wherein a central open section 88 is between the two belt support rails 9, each of which extends to the outer edges 84, 85, of the wire belt 2.

FIG. 5E illustrates a wire belt 2 configuration, similar to that of FIG. 5B, wherein the two belt support rails 9 each extend all 360° of the wire belt 2. FIG. 5F illustrates a wire belt 2 configuration, similar to that of FIG. 5A, wherein the two belt support rails 9 are intermittent, comprising three different sections 9a, 9b, 9c, each separated by spaces 94a, 94b, 94c. The open spaces 94a, 94b, 94c serve to lower the internal stresses in the support rails 9, and allow more stability, and required less driving power (e.g., by the motor) for the wire belt 2 to traverse the end turns 18. The dimensional orientation change can be seen in open space 94b as it moves through the right (e.g., distal) end turn 18.

In some embodiments, the belt support rail 9 has a thickness of between about 1 mm to about 12 mm, or about 4 mm to about 8 mm, or about 5 mm to about 7 mm, or about 6 mm. or about 0.25 inch. Each belt support rail 9 has a width of between about 6 mm to about 150 mm, or about 25 mm to about 50 mm, or about 38 mm. In some embodiments there can be a single belt support rail 9, but the embodiment shown in FIGS. 5A-5D comprises two, parallel belt support rails 9. The two belt support rails 9 can be separated by a distance d of between about 15 mm and about 100 mm, or between about 20 mm and about 50 mm. Each belt support rail 9 is configured to slidably contact an edge 19 (FIGS. 2 and 6A) of the stainless steel guide rails 10. The guide rails 10 can alternatively comprise another metal or another very rigid material Thus, the lower friction sliding aided by the lubricious materials of the belt support rail 9 versus the guide rails 10 minimizes the amount of particulate that is produced, and minimizes the current pull on the motor 81. As shown in FIGS. 6B and 6C, in some embodiments, Replaceable rail covers 11, comprising a fluoropolymer, such as polytetrafluoroethylene (PTFE), or another lubricious material, are configured to further minimize friction between the guide rails 10 and the wire belt 2/support rails 9.

In one embodiment, replaceable rail covers 11 (FIG. 6B) are slid onto or snapped onto the guide rails 10. The rail covers 11 are made of a high temperature, hard, lubricious polymer such as PEEK (polyether ether ketone) or polytetrafluoroethylene (PTFE). The rail covers 11 can comprise split tubing, longitudinally slip tubing, or shaped extrusions, and have a general semi-circular C-shape or a U-shape cross-section. The rail covers 11 provide further wear resistance and reduced friction between the guide rails 10 and the wire belt 2. By providing ample support from underneath, with reduced friction, the rail covers can allow the wire belt 2 to not require the presence of the belt support rails 9. The rail covers 11 can be removed by hand and replaced with others as they become worn. The rail covers 11 are configured to slide onto or snap onto the guide rails 10 without use of tools. In some embodiments, as shown in FIG. 6C, the rail covers 11 can be a complete tube, and can be shrunk on to the guide rails 10 (as heat-shrink tubing), or can be overextruded onto the guide rails 10, or can be simply slid onto the guide rails 10. In some embodiments, however, the stainless steel guide rails 10 are not required, because, for example, the belt support rails 9 add sufficient rigidity and/or stability by themselves.

Figure 10:
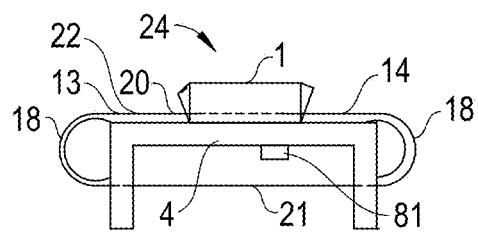
FIG. 10 is a side plan view of a heat processing system, having the metal chain belt of FIG. 8, according to an embodiment of the present disclosure.

In some embodiments, the belt support rails 9 can be at least one-half of the length of the heating chamber 1, and in other embodiments, the belt support rails 9 can be substantially the entire length of the heating chamber 1, or even slightly longer than the heating chamber 1. The wire belt 2 comprises a topside substantially linear sub-path 20 (FIGS. 4 and 20) having a planar configuration on which the assemblies ride, as well as the end turns 18, one at each end, and an underside return path 21. The topside linear sub-path 20 and the underside return path 21 are parallel to each other, as shown in FIG. 10. However, in alternative embodiments, one of the end turns 18 can comprise a different turn diameter than the other; thus, in these embodiments, the topside linear sub-path 20 can be level (with the ground) while the underside return path 21 is not level with the ground. The belt 2 can comprise twenty or more links, or fifty of more links, or two hundred or more links, or can comprise twenty or more transverse wires, or fifty of more transverse wires, or two hundred or more transverse wires.

Figure 13:
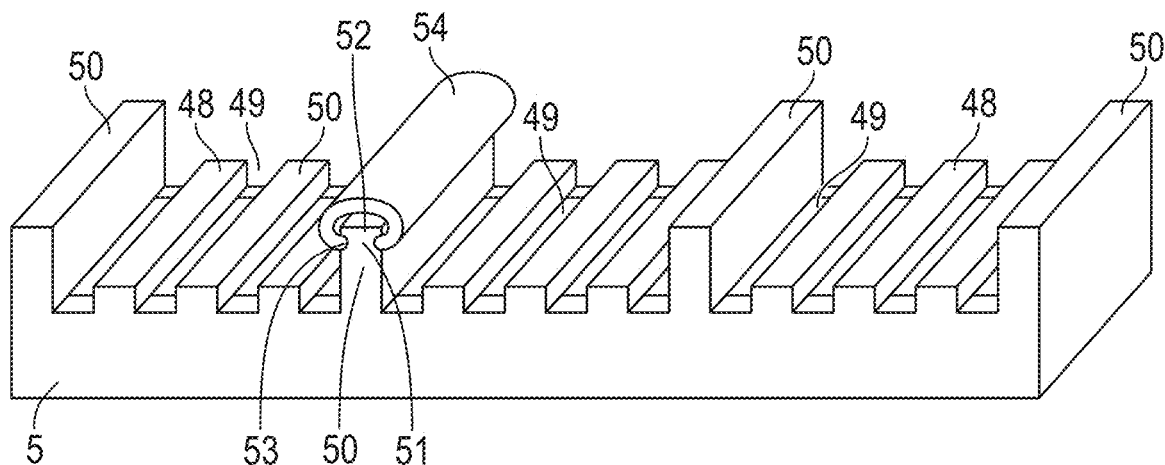
FIG. 13 is a perspective view of a heating platen of a heat processing system, according to an embodiment of the present disclosure.

FIG. 13 illustrates a heating platen 5 having fins 48 with elongate orifices 49 therebetween for allowing air to pass therethrough and be heated. Interspersed are elevated fins 50, each having an increased vertical height. The heating platens 5 that are carried above the belt 2 and the heating platens 5 that are carried below the belt 2 can each comprise fins that extend either transversely to the direction of belt travel, or in the same direction as the direction of belt travel. The embodiment of FIG. 13 illustrates a heating platen 5 configured for placement below the belt 2. Some or all of the elevated fins 50 comprise an elongate snap body or tab 51 having an enlarged end 52 and a reduced width portion 53. A wear rail 54 comprising an elongate U-shape or C-shape extrusion can be snapped or slid over the elongate snap body or tab 51 to keep the wear rail 54 in place on the elevated fin 50. The fins (48, 50) extend in a longitudinal direction, 90° from the fins visible in the platens 5 of FIG. 2. Thus, when used as lower platens 5 (below the belt 2) the elevated fins 50 and wear rails 54 are together configured to operate in the same manner as the guide rails 10 and rail covers 11 of FIGS. 6A-6C. The wear rail 54 can comprise a lubricious material such as polyether ether ketone (PEEK) or polytetrafluoroethylene (PTFE). The wear rails 54 are easily replaceable as they are worn or damaged. Thus, the guide rails 10 of FIG. 6A can in some embodiments be completely replaced by the elevated fins 50 (and wear rails 54) of FIG. 13.

Figure 7A:
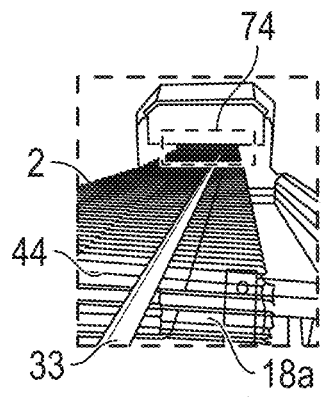
FIG. 7A is an overview of the utilizing heat processing system, according to an embodiment of the present disclosure.
Figures 7C, 7D:
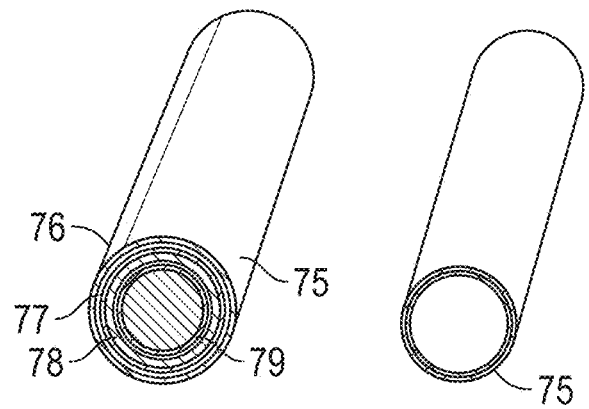
FIG. 7C is a perspective view the layers of a composite catheter tubing assembly being manufactured, according to an embodiment of the present disclosure.
FIG. 7D is a perspective view of the finished catheter tubing assembly from FIG. 7C.

FIG. 7A illustrates a catheter assembly 33 being carried on the wire belt 2 into a small open area 74 that is defined by width W1 and height HMAX (W1×HMAX) as shown in FIGS. 5A-5B. The open area 74 is configured to be just slightly larger than the space required to fit the catheter assemblies 33 that will be processed. In some embodiments, the open area 74 is adjustable, for example by an adjustable belt height or an adjustable window in the heating chamber 1. By minimizing the effective open area 74 in the entrance to the interior 16 of the chamber 1, heat loss from the interior is minimized.

Figure 6A:
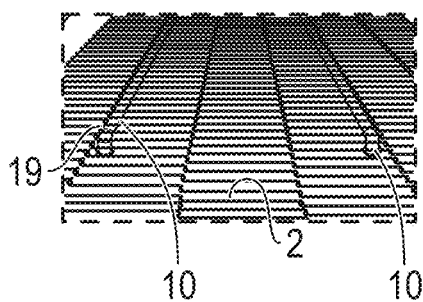
FIG. 6A is perspective view of an alternative heat processing system, according to an embodiment of the present disclosure.
Figure 6B:
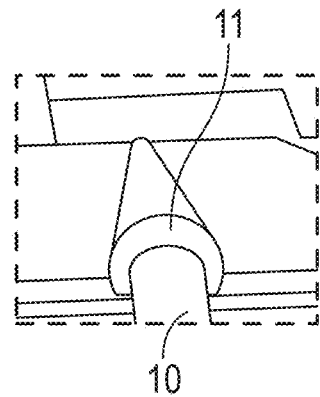
FIG. 6B is a first detailed view of guide rails and guide rail covers, according to an embodiment of the present disclosure.
Figure 6C:
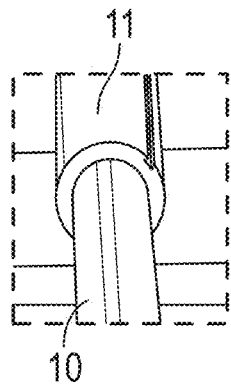
FIG. 6C is a second detailed view of guide rails and guide rail covers, according to an embodiment of the present disclosure.

As shown in both FIG. 6A and FIG. 7A, the conveyor belt 2 comprises a series of flat wire links 44 comprising stiff transverse wires that are spaced form each other, and are held by a high temperature, longitudinally extending flexible wire or filament 83 that is configured to take a curved shape at the end turns 18, and to straighten out along the topside linear sub-path 20 and the underside return path 21. The end turn 18a (at the loading zone 13) is shown in FIG. 7A.

Figure 7B:
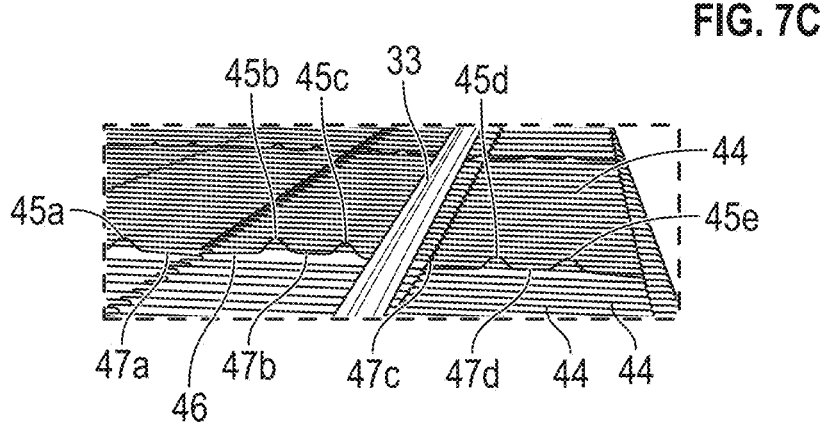
FIG. 7B is a perspective view of ribs of the heat processing system of FIG. 7A.

Turning to FIG. 7B, the wire belt 2 includes some flat wire links 44, with some retaining wire links 46 having one or more vertical projections 45a-e comprising bends in the retaining wire links 46. In the embodiment shown in FIG. 7B, the projections 45a-e are each in a single retaining wire link 46 at different transverse orientations from each other, thus forming an outer-facing platform 47a-d therebetween. However, in alternative embodiments, one projection 45a can be on a first retaining wire link 46, and a second projection 45b can be on a second retaining wire link 46 that is either adjacent or non-adjacent to the first retaining wire link 46. The same is true for the other projections 45c-e. The entire wire belt 2 can comprise only two types of wire links, the wire links 44 and the retaining wire links 46, as shown in FIG. 7B. Alternatively, three or more types of wire links can be used. Alternatively, all of the wire links can be retaining wire links 46. A "retaining wire link" 46 has at least one retaining feature, such as a vertical projection 45. The vertical projection 45 can comprise a bend in the wire, or a separate piece bonded, soldered, welded, crimper, or otherwise attached to the wire. In some embodiments, the bend comprises V-shape. In some embodiments, the bend comprises a C-shape. In some embodiments, the bend comprises a flat volcano shape. The one or more vertical projections 45a-e serve to create an effective longitudinally extending trough (e.g., between the vertical projections 45) to prevent catheter assemblies 33 from rolling, sliding, or migrating transversely on the wire belt 2. The one or more vertical projections 45a-e also can allow the catheter assemblies 33 to be distributed or spread out such that they do not clump together. For example, to keep them from migrating more than one-half of the total width of the wire belt 2. In some embodiments, the wire belt 2 can comprise fifty or more wire links 44, 46. In some embodiments, the wire belt 2 can comprise one hundred or more wire links 44, 46. In some embodiments, each of the wire links 44, 46 can be separated from an adjacent one of the other wire links 44, 46 by a distance of between about 5 mm and about 35 mm.

The open wire construction with spaces between each adjacent wire link 44, 46 allows hot air inside the interior 16 of the chamber 1 to circulate as parts (e.g., catheter assemblies 33) are conveyed through the chamber 1.

FIG. 7C illustrates an exemplary composite tube 75 configured for heat processing within the chamber of the horizontal conveyorized heater system 12. The composite tube 75 is shown immediately after heat processing, and may be considered one type of catheter assembly 33. The composite tube 75 includes a stainless steel mandrel 79, which can be uncoated, or can have a silicone or PTFE coating, for ease of removal after processing of the composite tube 75. The removal of the mandrel 79 after the heating and cooling of the composite tube 75 leaves in its place a cylindrical catheter lumen. In some embodiments, the mandrel 75 can have a non-circular cross-section, and thus can leave a non-circular cross-section lumen after removal of the mandrel 79. A PTFE or FEP (fluorinated ethylene propylene) liner 78 is the inner layer of the composite tube 75. A thermoplastic extrusion 77 is placed over the liner 78, and is configured to be heated and radially compressed over and onto the liner 78, but the shrinking of an FEP (fluorinated ethylene propylene) shrink tube 76. FIG. 7D illustrates the composite tube 75 after heating, cooling, and the removal of the mandrel 75 and removal of the FEP shrink tube 76. The FEP shrink tube 76 can be removed by slicing, peeling, or trimming.

Figure 8:
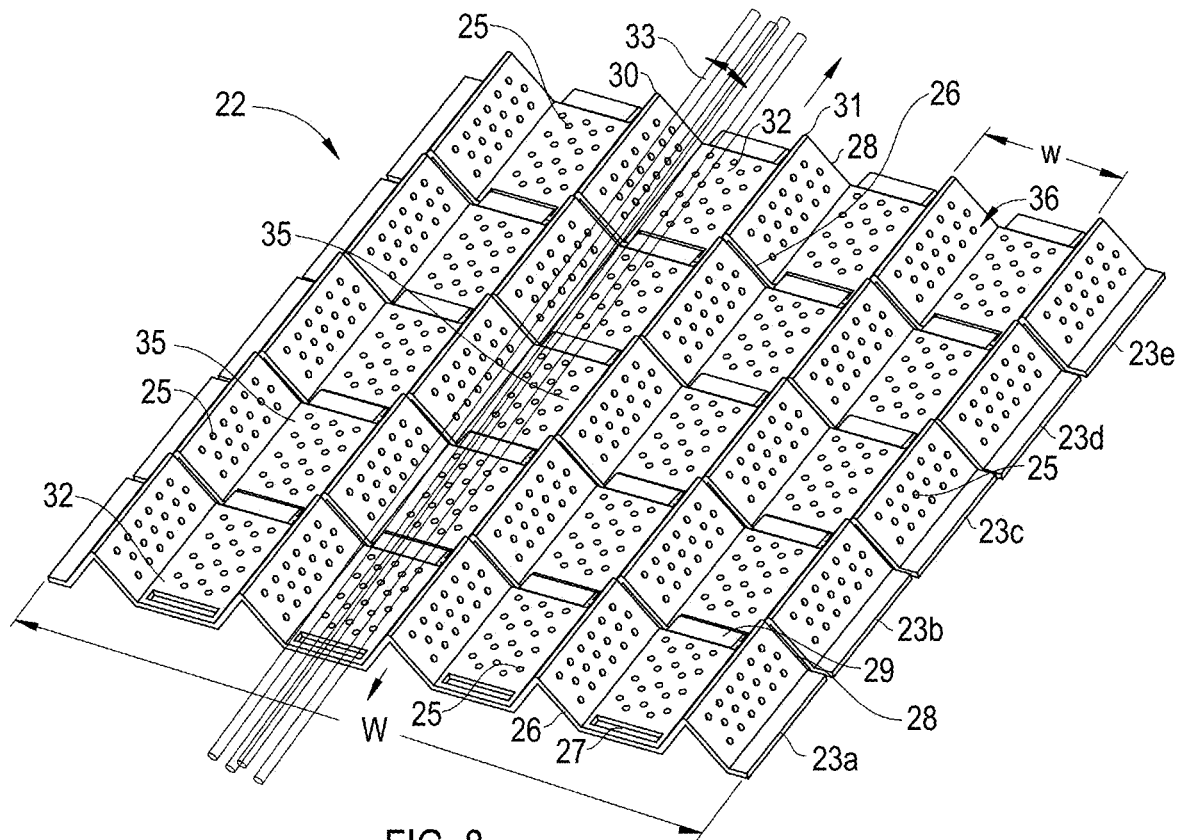
FIG. 8 is a perspective view of a metal chain plate belt of a heat processing system, according to an embodiment of the present disclosure.
Figure 9:
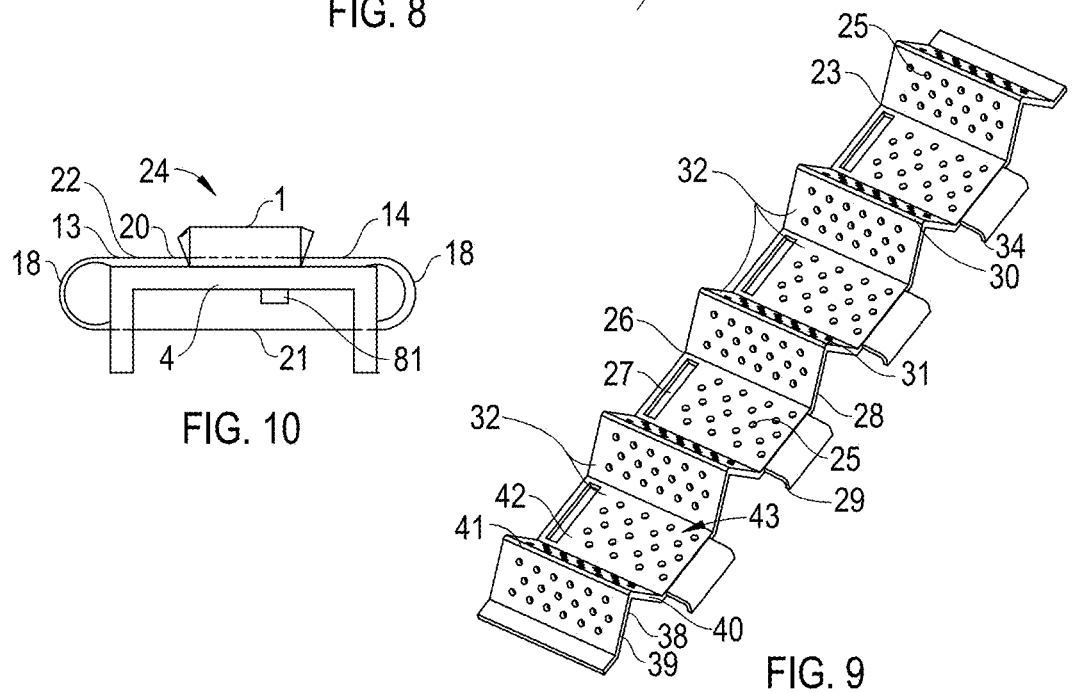
FIG. 9 is a perspective view of a single metal plate link of the metal chain belt of FIG. 8.
Figure 17:
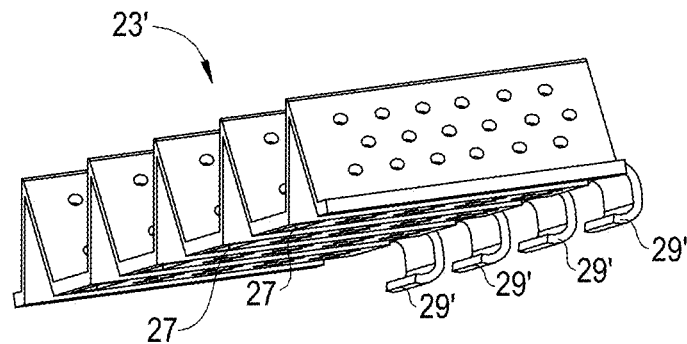
FIG. 17 is a perspective view of a single metal plate link of the metal chain belt, according to an alternative embodiment of the present disclosure.
Figure 18:
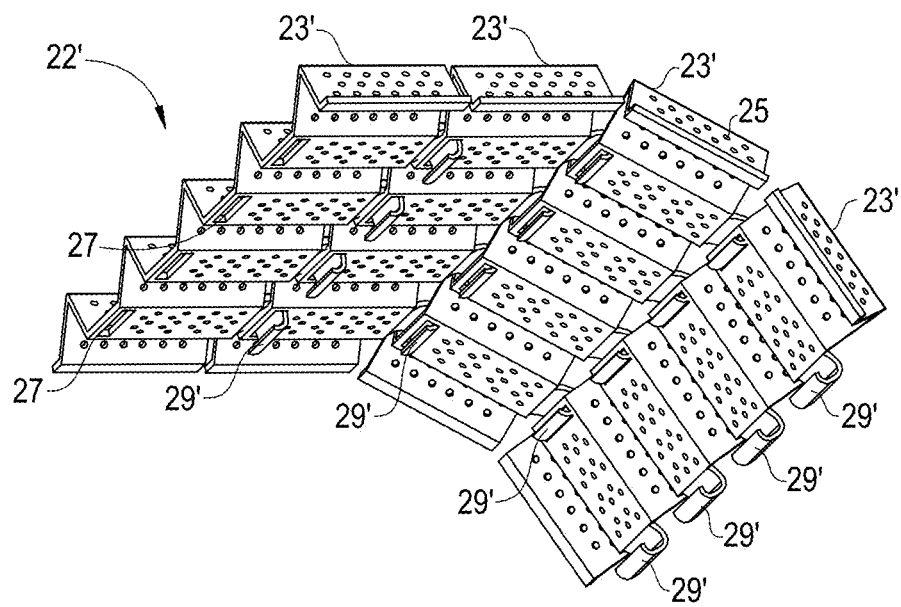
FIG. 18 is a perspective view of a metal chain plate belt of a heat processing system, according to an alternative embodiment of the present disclosure.

Turning to FIGS. 8-10, a horizontal conveyorized heater system 24 for the controlled reflow of multi-material catheters comprises a metal chain plate belt 22 comprising twenty or more individual metal plates 23. Each metal plate 23a-e comprises a plurality of perforations 25. The perforations 25 are configured to allow a freer transfer of heat and movement of air molecules throughout the system 24, to allow for efficient heating and cooling. The perforations 25 also effectively reduce the total mass of each plate 23, and thus the mass of the entire metal chain plate belt 22. Thus, less power is required to drive the metal chain plate belt 22. The belt can comprise twenty or more links, or fifty of more links, or two hundred or more links. At least 75% of the metal plates 23 in each metal chain plate belt 22 can be configured to have perforations 25, although in some embodiments, all of the metal plates 23 in the metal chain plate belt 22 can have perforations 25. Each metal plate 23 comprises a first end 26 comprising at least one transverse slit 27 and a second end 28 having at least one sliding hook 29 or generally, a tab. Each hook 29 is configured to slidingly couple to a slit 27 of an adjacent metal plate 23. The slidability of the hook 29 within the slit 27 allows the metal chain plate belt 22 to easily traverse the 180° end turns 18. The hook 29 can rotate around a transverse axis while remaining within the slit 27 to allow the adjacent metal plates 23 to remain coupled to each other while the hook 29 slides within the slit 27 as the belt 22 is moving around the 180° end turns 18. The metal plates 23 are also configured to become substantially parallel to each other (FIG. 8) such that the metal chain plate belt 22 comprises a topside substantially linear sub-path 20 and underside return path 21 (FIG. 10). In some embodiments, the end 34 of the hook 29 can be enlarged or otherwise reshaped after the hook 29 is inserted into the slit 27 such that the two adjacent metal plates 23 are permanently locked together. In some embodiments, the hook/tab 29 of each of the twenty or more links comprises an arc of at least 90°. In some embodiments, the hook/tab 29 of each of the twenty or more links comprises an arc of at least 120°. In some embodiments, the hook/tab 29 of each of the twenty or more links comprises an arc of at least 150°. In some embodiments, the hook/tab 29 of each of the twenty or more links comprises an arc of at least 180°. In some embodiments, the hook/tab 29 of each of the twenty or more links comprises an arc greater than 180°, which is configured to lock permanently to the adjacent slit 27 of an adjacent plate 23. FIGS. 17-18 illustrate a portion of an alternative metal chain plate belt 22' comprising metal plates 23' that comprise hooks 29' having a 180° arc. FIG. 17 illustrates an individual metal plate 23' and FIG. 18 illustrates the alternative metal chain plate belt 22' with the two left metal plates 23' in a straight, flat configuration, as in the topside linear sub-path 20 or the underside return path 21, and with the two right metal plates 23' in a curved shape, as in the end turns 18. The features of the metal plates 23' are otherwise the same as the metal plates 23 of FIGS. 8-9.

Each metal plate 23 includes at least a first longitudinally-extending barricade 30 and a second longitudinally-extending barricade 31. The first longitudinally-extending barricade 30 and second longitudinally-extending barricade 31 comprise corrugations in the metal plates 23. The first longitudinally-extending barricade 30 and second longitudinally-extending barricade 31 create vertical projections (similar to mountains or towers) that divide a generally planar outer-facing surface 32 (similar to a valley). In the metal plate 23 illustrated in FIGS. 8 and 9, there are four generally planar outer-facing surfaces 32 that are defined by the division created by five longitudinally-extending barricades 30, 31. The plurality of metal plates 23, placed and interconnected in series, align each of the generally planar outer-facing surfaces 32 of a particular transverse position together in a longitudinal row, creating a continuous generally planar linked surface 35. The generally planar outer-facing surfaces 32 and obtusely angled sides/walls 39, 40 of the longitudinally-extending barricades 31 form a trough or valley 43, but in other embodiments, the walls can angle at 90°, or even less (e.g., acutely). In some embodiments, the generally planar outer-facing surfaces 32 form an angle with the sides/walls 39, 40 of between 45° and 90°. In some embodiments, the cross-sectional shape of the generally planar outer-facing surfaces 32 can be semi-circular or otherwise generally concave. As illustrated in FIG. 8, the obtuse angles allow for easy placement of catheter assemblies 33 in the loading zone 13, and easy removal of the catheter assemblies 33 from the unloading zone 14. As can be seen in FIG. 8, the catheter assemblies 33 extending within the second generally planar linked surface 35 from the left, are restricted in their transverse movement by the series of longitudinally-extending barricades 30, 31 on each side of the generally planar linked surface 35. Thus, the catheter assemblies 33 can be easily maintained, ordered, and/or segregated from each other by placement into one or other of the generally planar linked surfaces 35. The longitudinally-extending barricades 31 each comprise a V-shaped cross section 38 formed by a first wall 39 and a second wall 40, angled from the first wall 39. The two walls 39, 40, meet at an apex 41 comprising a longitudinally-extending ridge. In the embodiment of FIGS. 8-9, the perforations 25 are located on the first walls 39 and on the second walls 40 of the V-shaped cross section 38, and on a horizontal face 42 of each generally planar outer-facing surface 32. The generally planar outer-facing surfaces 32 can be used to keep catheter assemblies 33 separated from each other, in applications in which flow of hot air must contact all of the assemblies 33, or where air flow must be aided or augmented.

In some embodiments, each of the generally planar outer-facing surfaces 32 can form troughs 36 having a width w that is less than one-half of a width W of the metal chain plate belt 22, or less than one-third, or less than one-fourth, or less than one-fifth, or less than one-sixth, or less than one-seventh, or less than one-eighth, or less than one-ninth, or less than one-tenth. In FIG. 8, the width w is less than one-fourth of the width W of the metal chain plate belt 22. Returning to FIGS. 5A-5B, the interior 16 of the heating chamber 1 has a first opening 74 and a second opening—not shown, but at the other end of the interior 16 adjacent the unloading zone 14—each configured to have a width $W_1$ that is slightly wider than the width W of the belt, and to have a maximum height $H_{Max}$ that high enough to accommodate the metal chain plate belt 22 and the catheter assemblies 33 on the metal chain plate belt 22, with minimal excess.

Figure 11:
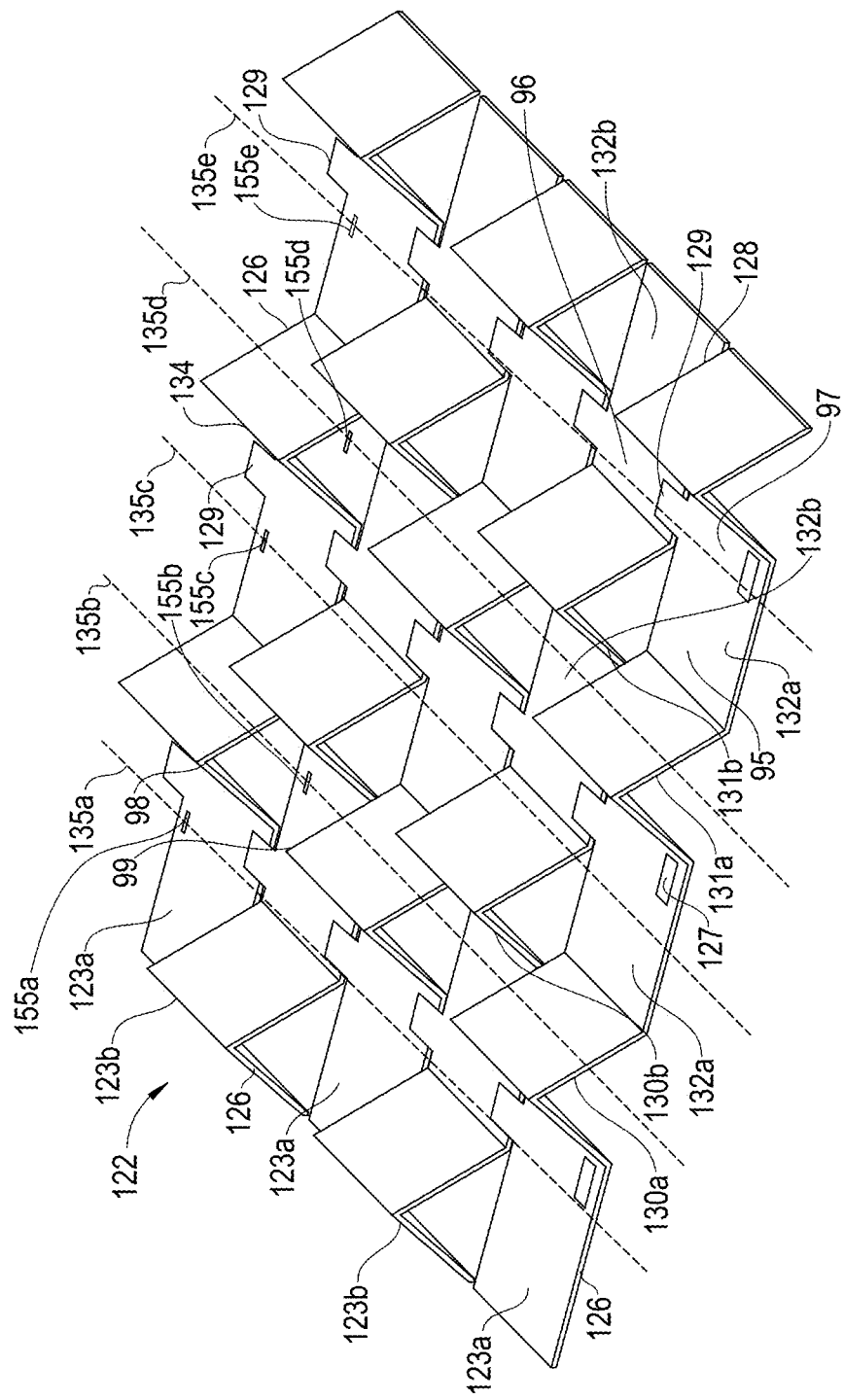
FIG. 11 is a perspective view of a metal chain plate belt of a heat processing system, according to an embodiment of the present disclosure.

In FIG. 11, a metal chain plate belt 122 comprises twenty or more individual metal plates 123a, 123b. Each metal plate 123a, 123b comprises a plurality of perforations (not shown). The perforations are similar to the perforations 25 in FIGS. 8 and 9. The perforations are configured to allow a freer transfer of heat and movement of air molecules throughout a horizontal conveyorized heater system, to allow for efficient heating and cooling. At least 75% of the metal plates 123a, 123b in each metal chain plate belt 122 can be configured to have perforations 25, although in some embodiments, all of the metal plates 123a, 123b in the metal chain plate belt 122 can have perforations 25. Each metal plate 123a, 123b comprises a first end 126 comprising at least one transverse slit 127 and a second end 128 having at least one sliding hook 129 or generally, a tab. Each hook 129 is configured to slidingly couple to a slit 127 of an adjacent metal plate 123a or 123b. The slidability of the hook 129 within the slit 127 allows the metal chain plate belt 122 to easily traverse the 180° end turns 18 (as in FIG. 10). The hook 129 can rotate around a transverse axis while remaining within the slit 127 to allow the adjacent metal plates 123a or 123b to remain coupled to each other while moving around the 180° end turns 18. The metal plates 123a, 123b are also configured to become substantially parallel to each other (FIG. 11) such that the metal chain plate belt 122 comprises a topside substantially linear sub-path 20 and underside return path 21 (FIG. 10). In some embodiments, the end (similar to end 34) of the hook 129 can be enlarged or otherwise reshaped after the hook 129 is inserted into the slit 127 such that the two adjacent metal plates 123a, 123b are permanently locked together. In the embodiment shown in FIG. 11, metal plates 123a and metal plates 123b alternate along the 180° path. The topside substantially linear sub-path 20 can comprise a changing subset of one or more metal plates 23, 123, or two or more metal plates 23, 123, or five or more metal plates 23, 123, or ten or more metal plates 23, 123, or twenty or more metal plates 23, 123, or 50 or more metal plates 23, 123, or 100 or more metal plates 23, 123. The length of the topside substantially linear sub-path 20 depends on the length of the flat workspace needed. This may be judged based on the maximum length of the catheter assemblies 33 being processed, or by the necessary length of the chamber 1.

In some embodiments, the hook/tab 129 of each of the twenty or more links comprises an arc of at least 90°. In some embodiments, the hook/tab1 29 of each of the twenty or more links comprises an arc of at least 120°. In some embodiments, the hook/tab 129 of each of the twenty or more links comprises an arc of at least 150°. In some embodiments, the hook/tab 129 of each of the twenty or more links comprises an arc of at least 180°. In some embodiments, the hook/tab 129 of each of the twenty or more links comprises an arc greater than 180°, which is configured to lock permanently to the adjacent slit 127 of an adjacent plate 123a, b.

Figure 12:
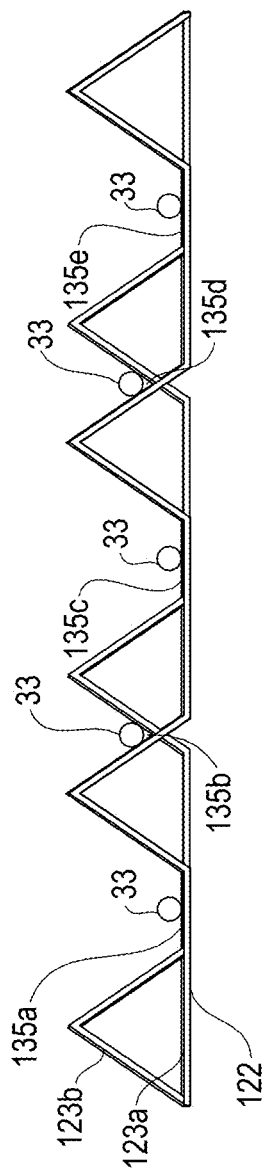
FIG. 12 is a cross-sectional view of the metal chain plate of FIG. 11.

Each metal plate 123a includes at least a first longitudinally-extending barricade 130a and a second longitudinally-extending barricade 131a. Each metal plate 123b includes at least a first longitudinally-extending barricade 130b and a second longitudinally-extending barricade 131b. The first longitudinally-extending barricade 130a, 130b and second longitudinally-extending barricade 131a, 131b comprise corrugations in the metal plates 123a, 123b. The first longitudinally-extending barricade 130a, 130b and second longitudinally-extending barricade 131a, 131b create vertical projections (similar to mountains or towers) that divide a generally planar outer-facing surface 132a, 132b (similar to a valley). The vertical projections each include a peak or apex 134. In each metal plate 123a there are three generally planar outer-facing surfaces 132a that are defined by the division created by five of the longitudinally-extending barricades 130a, 131a. In each metal plate 123b there are three generally planar outer-facing surfaces 132b that are defined by the division created by five of the longitudinally-extending barricades 130b, 131b. The alternating plurality of metal plates 123a, 123b, align only a portion of each of the generally planar outer-facing surfaces 132a with only a portion of the generally planar outer-facing surfaces 132b, creating five concave troughs 135a-e for holding elongate catheter assemblies. This is shown in both FIG. 11 and FIG. 12. The generally planar outer-facing surfaces 132a, 132b and obtusely angled sides/walls can form obtuse (as shown), acute, or 90° angles, in different embodiments. In other embodiments, the cross-sectional shape of the generally planar outer-facing surfaces 32 can be semi-circular or otherwise generally concave. FIG. 12 illustrates how the catheter assemblies 33 are held at two different levels (heights/elevations). In other embodiments, one or both of the metal plates 123a, 123b can be constructed to be "double-decker." In other words, and first (lower) plate can be configured (with hooks, slits, indentations, notches, tabs, etc.) to allow the snug, secure placement of a second (upper) plate, each of the plates being configured to maintain the catheter assemblies as in the plates described herein. The number of holes 25 can be controlled in order to assure that air circulates sufficiently.

The metal chain plate belt 122 does not have any significant pinch points, when the metal chain plate belt 122 is in the substantially planar condition shown in FIG. 11. For example, it would be difficult for an operator to pinch a finger between a first point 99 and a nearest second point 98. The longitudinally-extending barricades 130a, 130b do not directly orient adjacent to the longitudinally-extending barricades 131a, 131b when the metal chain plate belt 122 is in the substantially planar condition. The hooks 129 and the slits 127 are each offset within the generally planar outer-facing surfaces 132a, 132b, such that they are able to connect to each other in adjacent metal plates 123a, 123b. A first portion 97 of the generally planar outer-facing surface 132a longitudinally aligns with a first portion 96 of the generally planar outer-facing surface 132b. A second portion 95 of the generally planar outer-facing surface 132a aligns with longitudinally-extending barricade 131b. Thus, an efficient, linked construction is possible of the unlike adjacent metal plates 123a, 123b, while defining the five concave troughs 135a-e. In FIG. 12, single catheter assemblies 33 are shown within each of the five concave troughs 135a-e.

Figure 14A:
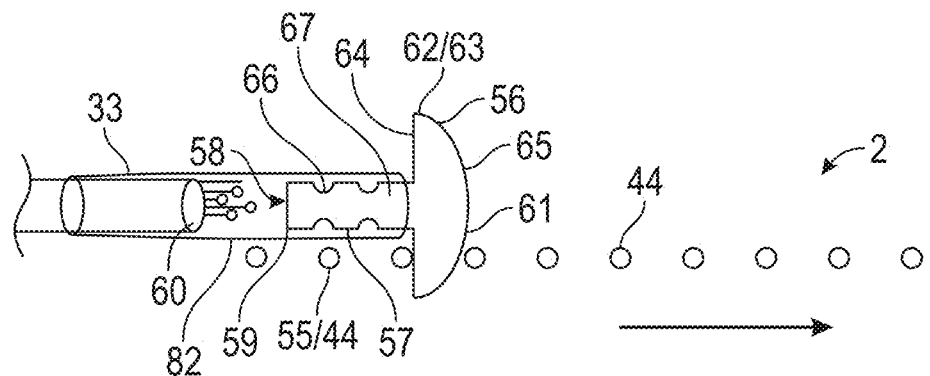
FIG. 14A is an elevation view of an anchor in use in a heat processing system, according to an embodiment of the present disclosure.
Figure 14B:
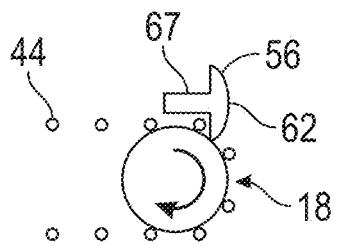
FIG. 14B is an elevation view of an anchor in use in a heat processing system, according to an embodiment of the present disclosure.
Figure 14C:
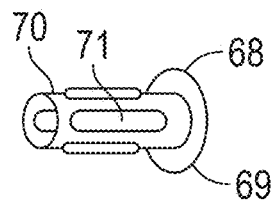
FIG. 14C is a perspective view of a first alternative anchor, according to an embodiment of the present disclosure.
Figure 14D:
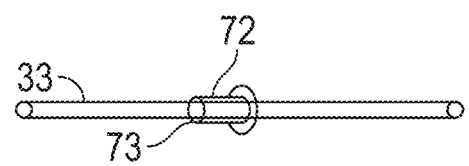
FIG. 14D is a perspective of a second alternative anchor, according to an embodiment of the present disclosure.

Any of the belts 2, 22, 122 taught herein can include one or more engagement portion 55, 155, comprising a hook, loop, indentation, lock, snap, clamp, clip, magnet, or catch configured to engage a catheter assembly 33 so that it is forced to move along the path of the belt 2, 22, 122 at least at the topside substantially linear sub-path 20, such that the catheter assembly 33 is moved in unison with the belt 2, 22, 122. In some embodiments, the engagement portion 55, 155 can be configured to push the catheter assembly 33. In some embodiments, the engagement portion 55, 155 can be configured to pull the catheter assembly 33. As shown in FIGS. 14A-14B, the engagement portion 55 is a wire link 44 of the wire belt 2, itself. An anchor 56 has a first end 57 having an inner lumen 58 and an outer cylindrical wall 59. The lumen 58 is configured to slide over an end 60 of a catheter assembly 33. The anchor 56 can then be secured to the end 60 by adhesive, or the lumen 58 can simply be undersized for a friction fit. Alternatively, the wall 59 can comprise shrinkable tubing to shrink (e.g., with heat and/or chemical) over the end 60 of the catheter assembly 33. In some embodiments, the anchor 56 can be bonded to the catheter assembly 33 by an adhesive or epoxy. In some embodiments, the first end 57 of the anchor 56 can be joined with the end 60 of the catheter assembly 33 by shrinking a shrink tube 82, that can later be removed. The anchor 56 has a second end 61 comprising a button 62. The button 62 has a maximum diameter 63 such that it is configured to catch between successive wire links 44 of the wire belt 2. The button 62 has a proximal flattened portion 64 that is configured to butt against and to be pulled by one or more wire link 44 of the wire belt 2, e.g., in the direction of belt movement (arrow). As the anchor 56 is pulled, the catheter assembly 33 is pulled with it moving it through the interior portion 16 of the heating chamber 1. Alternatively, the wire belt 2 can be moved in an opposite direction to that shown, and a flattened end portion 65 can be configured so that one or more wire link 44 butts against it and pushes the anchor 56, and thus, the catheter assembly 33 with it. The anchor 56 can also include one or more grooves 66 on a shaft portion 67. The grooves 66 are configured to alternatively or additionally engage with a wire link 44 to move the anchor 56 and catheter assembly 33 in unison with the wire belt 2. The metal chain plate belts 22, 122 can include their own engagement portions 55, 155. Turning to FIG. 11, engagement portions 155a-e comprise cavities, indentations, or abutments within the plate belts 123a, 123b and in some embodiments can pass all the way through the plate belts 123a, 123b. The engagement portions 155a-e can be configured to push and/or pull the anchor 56 and catheter assembly 33, as described. In the embodiment of FIG. 11, the engagement portions 155a-e have a substantially rectangular shape, configured to engage the button 62 of the anchor 56. An alternative anchor 68 is shown in FIG. 14C and comprises a metal flange 69 coated with a lubricious material such as polytetrafluoroethylene (PTFE), the anchor 68 further having a tubular silicone capture end 70 having longitudinal side openings 71. The tubular capture end 70 is configured to be forced over the end 60 of the catheter assembly 33 to engage it. The side openings 71 provide for some flex, and allow for frictional attachment, but also allow for deformation and stretch for removal. Another alternative anchor 72, shown in FIG. 14D, has a through hole 73 (i.e., extending all the way through the anchor 72) such that it can be slid all the way over a catheter assembly 33. As shown, the anchor 72 can be slid to a middle portion of the catheter assembly 33. This can aid the ability to push and/or pull the catheter assembly 33 with the belt 2, 22, 122. For example, the push or pull of a very long catheter assembly 33 can be further stabilized, and be less prone to flexing or catching. Any of the anchors 56, 68, 72 can be cut off of the catheter assembly 33 or pulled off of the catheter assembly 33 after the relevant process steps have been completed.

Figure 15:
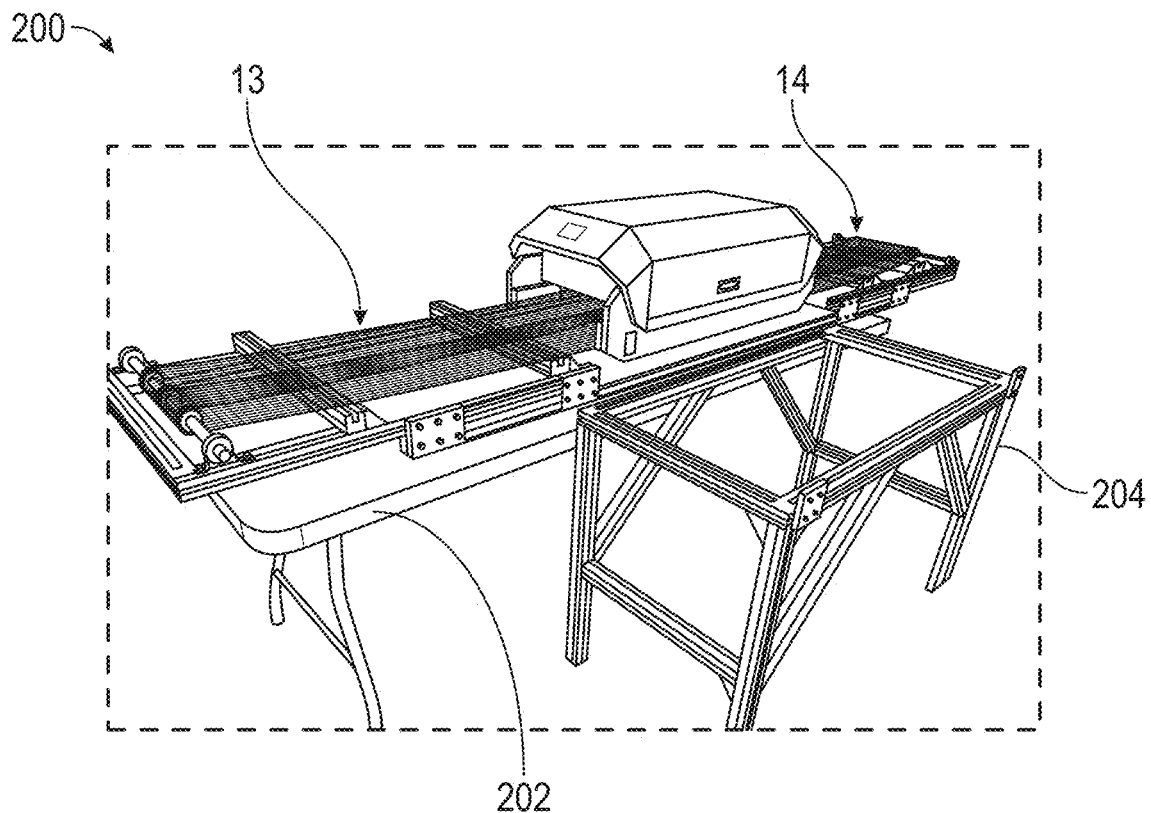
FIG. 15 is a perspective view of a heat processing system, according to an embodiment of the present disclosure.
Figure 16:
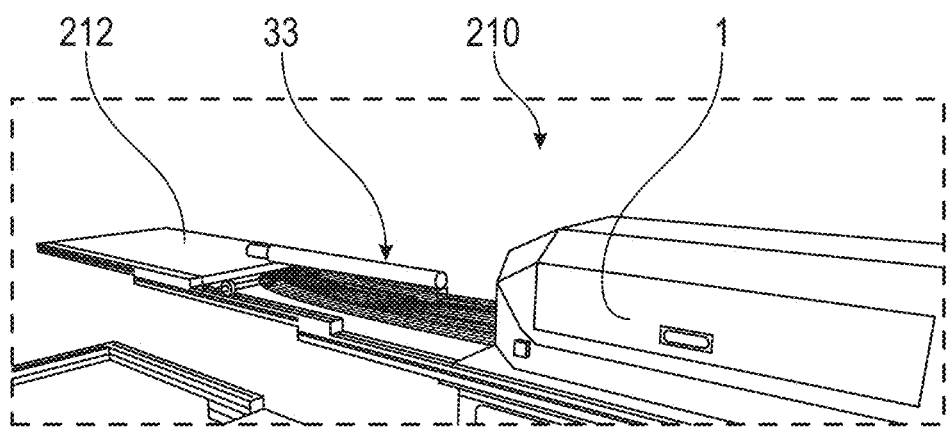
FIG. 16 is a perspective view of a heat processing system, according to an embodiment of the present disclosure.

In FIG. 15, a heat processing system 200 has a modular design, allowing mix and match bench top configurations, for example, using a table 202, and/or using a stand 204. In FIG. 16, a heat processing system 210 includes a surface extender 212 to support proximal ends of extra-long catheter assemblies 33 as they are about to be processed through the chamber 1.

While the foregoing is directed to embodiments of the present disclosure, other and further embodiments can be devised without departing from the basic scope thereof. For example, instead of catheter assemblies 33, any type of elongate assembly (medical or non-medical) requiring heat processing can be treated by the systems disclosed herein.

Figure 19:
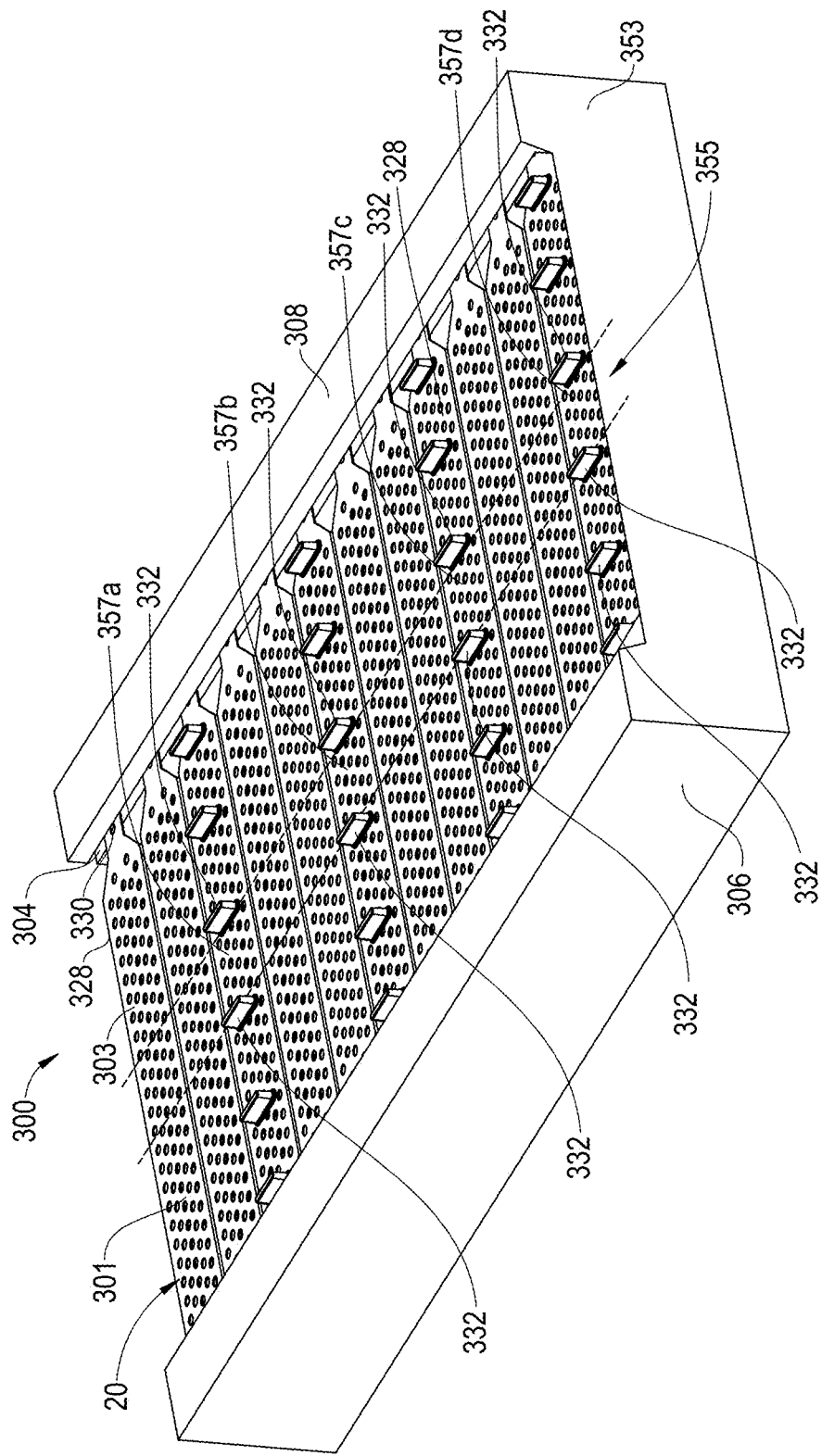
FIG. 19 is a perspective view of a heat processing system, according to an embodiment of the present disclosure.
Figure 20:
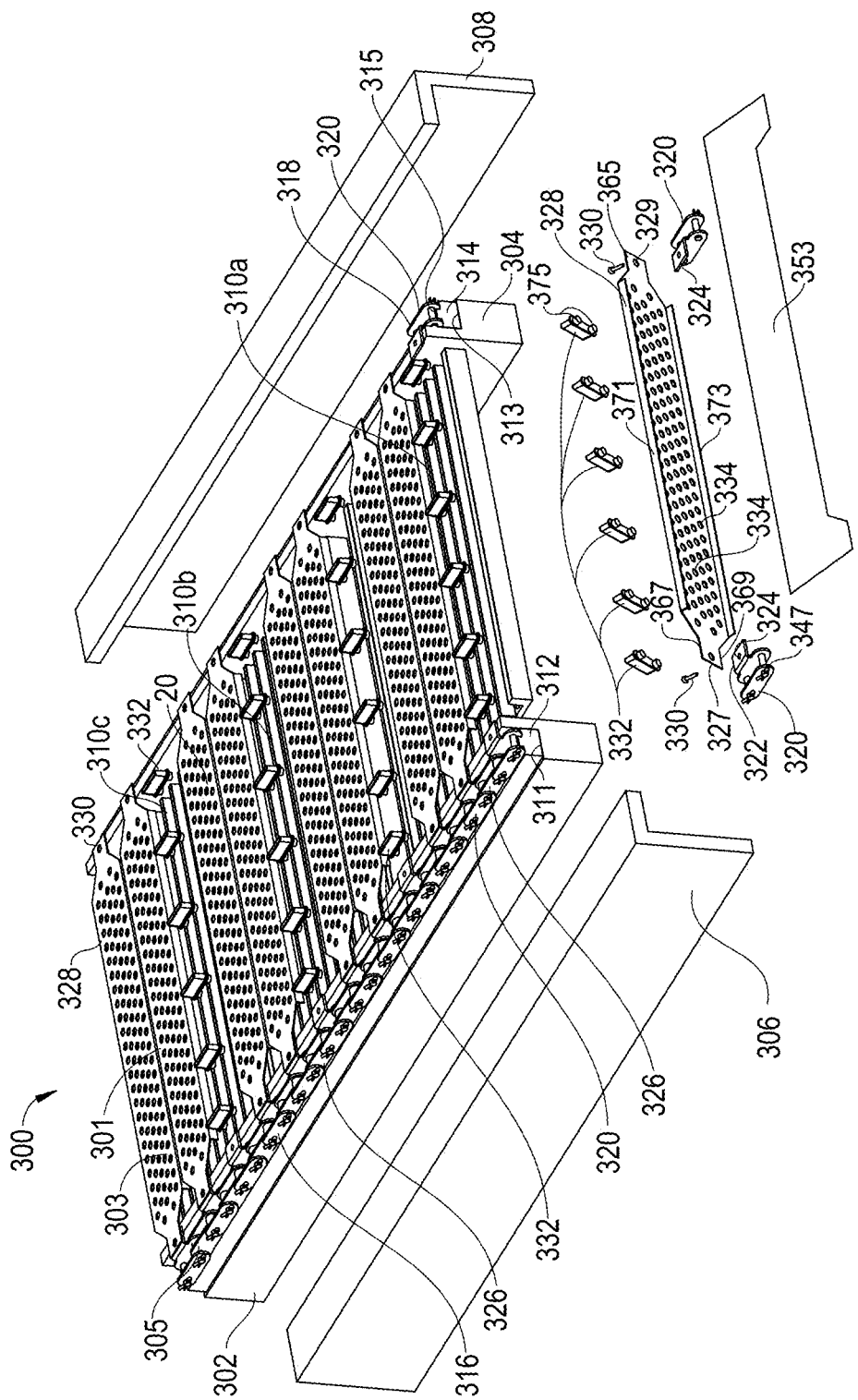
FIG. 20 is an exploded view of the heat processing system of FIG. 19.

FIGS. 19-20 illustrate a heat processing system 300 comprising a chain-driven conveyor belt 301 having twenty or more metal plates 328. In some embodiments, the metal plates 328 comprise stainless steel. A first elongate support structure 302 and a second elongate support structure 304 are laid out in parallel, and are configured for carrying the conveyor belt 301 and allowing it to traverse the 360°, as shown in the previous embodiments, though not completely depicted in FIGS. 19-20. Some of the metal plates 328 have been removed in FIG. 20 in order to show more detail of a lower portion of the heat processing system 300. A first chain 316 and a second chain 318 (partially shown) each provide a 360° loop path, on opposite sides of the heat processing system 300. In some embodiments, the loop path comprises an ellipse. In some embodiments, the loop patent comprises an oval. A topside substantially linear sub-path 303 of the conveyor belt 301 is the only portion of the belt 301 shown in FIG. 20, and thus, only the upper linear portion 305 of the chain 316. However, a lower, generally linear portion is similar to the underside return path 21 and end turns are similar to the end turns 18 of the previous embodiments. Each loop path can generally define a vertical plane, the first vertical plane of the 360° loop path of the first chain 316 parallel to the second vertical plane of the 360° loop path of the second chain 318.

Chain 318 is similar to chain 316, and is generally a mirror image. Chain 316 comprises a plurality of internal links 326 and plurality of external, attachment links 320. In other embodiments, the links 326, 320 do not comprise an internal link and an external link, but instead comprise to, similarly sized links that have a staggered connection. In the chain 316 of the heat processing system 300 shown in FIG. 20, the internal links 326 have a first outer width that fits within an inner width of the external, attachment links 320. In other embodiments, the attachment link can be the internal link. The external, attachment links 320 and the internal links 326 do not have to be similar in number. Some of the external, attachment links 320 can be replaced with a basic external link, with no attachment functionality.

Figure 21:
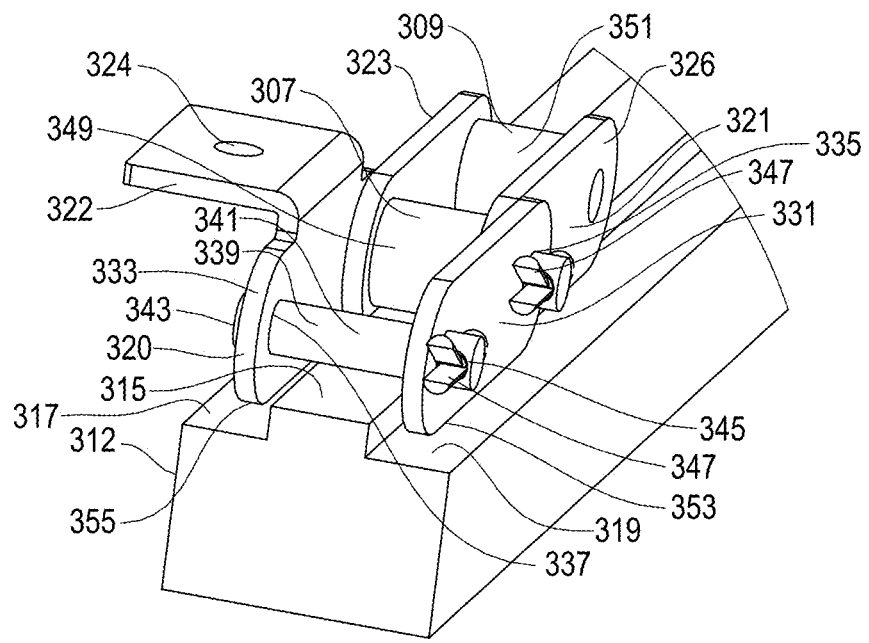
FIG. 21 is a detailed perspective view of a chain and chain guide assembly, according to an embodiment of the present disclosure.

Regarding the attachment functionality, the external, attachment links 320 each include a horizontally-extending connection plate 322 having a threaded hole 324. In the heat processing system 300 illustrated in FIGS. 19-20, the metal plates 328 are attached to each of the connection plates 322 in the chains 316, 318. Each metal plate 328 has a first connection through hole 327 and a second connection through hole 329. Screws 330 pass through the connection through holes 327, 329 of the metal plates 328 and threadingly engage with the threaded holes 324 of the connection plates 322. In alternative embodiments, the threaded holes 324 can be replaced with through holes, and a nut or a washer and nut can be used at the send of the screw 330. Each of the chains 316, 318 is configured to slide along a respective elongate roller chain guide 312, 314, that are each carried on an upper ledge 311, 313 of the support structures 302, 304. Turning to FIG. 21, a chain guide 312 is shown in isolation with a single internal link 326 and a single external, attachment link 320. The chain guide 312 is similar to the chain guide 316. The chain guide 312 includes a longitudinally-extending central ledge 315, and two longitudinally-extending outer undercuts 317, 319. The internal link 326 comprises two outer plates 321, 323 which are connected by two hollow cylinders 307, 309. The external, attachment link 320 comprises two outer plates 331, 333, each having two through holes 335, 337. The connection plates 322 extends at a 90° angle from the outer plate 333. Pins 339 having a shaft 341, a head 343 (having a diameter greater than the holes 335, 337), and a transverse hole 345 are inserted through the holes 335, 337 and through the internal cylindrical passage of the hollow cylinders 307, 309. The pin 339 in the foreground of FIG. 21 is visible, because no internal link 326 is shown connected to it, for clarity. Cotter pins 347 are lockingly placed through the holes 345. The outer surfaces 349, 351 of the hollow cylinders 307, 309 are smooth and are configured to slide along the central ledge 315 of the chain guide 316. The outer undercuts 317, 319 are sized such that the bottom edges of the outer plates 331, 333 of the external, attachment link 320 do not contact the undercut 317, 319 as the outer surfaces 349, 351 of the hollow cylinders 307, 309 slide along the central ledge 315. The chain guide 316 comprises a thermally-insulative, low friction material, such as ultra-high molecular weight polyethylene (UHMWPE).

Once the metal plates 328 are secured to the attachment links 320 via the connection plates 328, the 360° translation of the chains 316, 318 thus causes the plates to also circulate in the path (e.g., oval) while providing a topside substantially linear sub-path 303 at least through the interior 16 of the chamber 1 (see FIGS. 4, 5A-B, and 10). The thermally-insulative material of the chain guide 316 minimizes the amount of heat transfer between the chamber 1 and any heated air or heated parts and the chains 316, 318. Thus, the chains 316, 318 do not significantly heat up. In alternative embodiments, cool pressurized air is blown on the chains 316, 318 as they circulate 360°. In alternative embodiments, one or more additional heat sink (e.g., thermally-conductive wires) is located close to the chains 316, 318 or close to a nearby heated area but not contacting the chains 316, 318. Chain covers 306, 308 are placed over the chains 316, 318 and protect them from contact and/or dirt and dust. An optional front plate 353 can be used to further protect the chains 316, 318. However, in the embodiments which incorporate an exit end/unloading zone 14, it may or may not be desirable to utilize a front plate 353.

Some or all of the metal plates 328 can include longitudinal dividers 332 or fins that can be snapped onto the metal plates 328 and can be snapped off. As shown in FIG. 20, the dividers 332 each include two pins 375, that can snap into holes 334 in the plates 328, or into other holes made specifically for the pins 375. The dividers 332 extend substantially vertically, but in other embodiments can have some angulation to either side. This allows the creation of a generally planar composite surface 355, which includes the combination of several generally planar outer-facing surfaces 357a-d, each on separate metal plates 328. The generally planar outer-facing surfaces 357a-d are each longitudinally-extending sections of the metal plates 328, between two longitudinal dividers 332. The heat processing system 300 in FIG. 19 includes five parallel generally planar composite surfaces 355, Which are defined by four different metal plates 328, each configured with six longitudinal dividers 332. As shown in FIG. 19, not all of the metal plates 328 need to include dividers 332 in order to form one or more effective generally planar composite surfaces 355. The heat processing system 300 in FIG. 19 has one metal plate 328 with dividers 332 for every two metal plates 328 without dividers 332. However, the five parallel generally planar composite surfaces 355 are each configured to successfully maintain elongate catheter assemblies 33 within the particular generally planar composite surface 355 in which they are laid. With the chain 316, 318 and connection plate 322 attachment the heat processing system 300, each metal plate 328 (link) is longitudinally adjacent to a second metal plate 328 (link), but is not directly connected to the second metal plate 328 (link). A generally planar composite surface 355 need not be completely continuous. There may be spaces between each of the metal plates 328. As long as a catheter assembly 33 or other elongate assembly, can lie effectively along the generally planar composite surface 355 to be processed.

Figure 22:
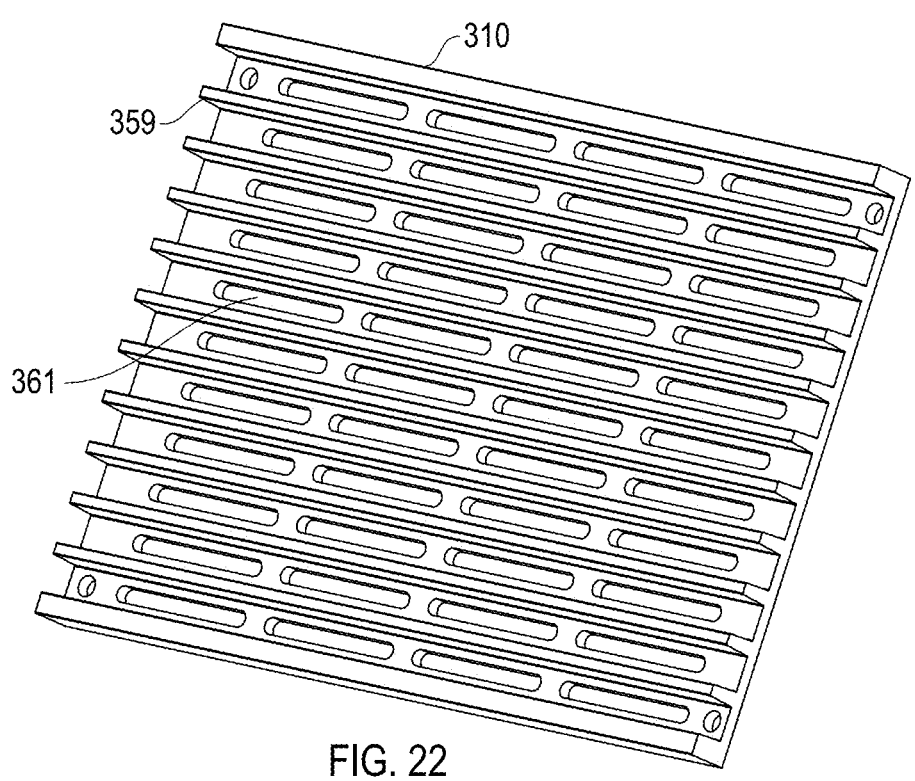
FIG. 22 is a perspective view of a heat conductor or platen, according to an embodiment of the present disclosure.

Cut-away portions in FIG. 20 illustrate the heat conductors or platens 310a-c that are coupled in a horizontal position underneath the topside substantially linear sub-path 20 of the conveyor belt 301. As shown in FIG. 22, the platens 310 include transversely extending ribs 359 and slits 361 (for the passage of heated air). Turning to FIG. 20, the metal plates 328 include a plurality of through holes 334, that allow heated air to pass therethrough. Or, during a cooling process, the holes 334 can allow ambient air (or other gas) or cooled air to pass therethrough. In some cases, it might be chosen to initially cool first with heated air that is slightly below the temperature of the heated catheter assemblies 33, before cooling with lower temperature air. Each metal plate 328 includes a short-length end 363, 365 on each side, where the length between the distal end 367 of the short-length end 363, 365 and the proximal end 369 of the short-length end 363, 365 is shorter than the length between the distal end 371 and the proximal end 373 of the metal plate 328. This minimizes conductive heat transfer between each metal plate 328 and the chain 316, 318. In some embodiments, the length between the distal end 367 of the short-length end 363, 365 and the proximal end 369 of the short-length end 363, 365 is less than one-half the length between the distal end 371 and the proximal end 373 of the metal plate 328.

In some embodiments, when the metal chain belt 22, 122 or conveyor belt 301 is in a translated position such a first plate 23, 123a, 123b, 328 having longitudinally-extending barricades and a second plate 23, 123a, 123b, 328 having longitudinally-extending barricades are both included in a changing subset of plates 23, 123a, 123b, 328 (for example, twenty or more, fifty or more, etc.) of the substantially linear sub-path 20, a distance between the distal end of the first plate 23, 123a, 123b, 328 and the proximal end of the second plate 23, 123a, 123b, 328 can be configured to be less than a total length of the substantially linear sub-path 20, such that an elongate member (e.g., catheter assembly 33) resting on and extending along a continuous generally planar linked surface 35, or concave trough 135, or generally planar composite surface 355, between the first longitudinally-extending barricade and the second longitudinally-extending barricade of each of the first and second plates 23, 123a, 123b, 328 is transversely restricted from migrating more than one-half of the width of the metal chain belt 22, 122 or conveyor belt 301. Or restricted from migrating more than one-quarter of the width of the metal chain belt 22, 122 or conveyor belt 301. Or restricted from migrating more than one fifth of the width of the metal chain belt 22, 122 or conveyor belt 301. Or restricted from migrating more than one eighth of the width of the metal chain belt 22, 122 or conveyor belt 301. Or restricted from migrating more than on twentieth of the width of the metal chain belt 22, 122 or conveyor belt 301. Thus, the catheter assemblies 33 or other elongate members for processing are positionally stabilized during the heat process and/or the cooling process. Furthermore, they can be kept in efficient positions for receiving the heat process and/or the cooling process.

Any of the plates 23, 123a, 123b, 328 can comprise at least four through holes 25, 334, or at least twelve through holes 25, 334, or at least 30 through holes 25, 334, or at least 50 through holes 25, 334, or at least 100 through holes 25, 334. Each of the plates 23, 123a, 123b, 328 is configured to rotate about a first axis (similar to axis 87 in FIGS. 5E and 5F) that is at or adjacent a distal end of the chamber 1 and to rotate about a second axis (similar to axis 86 in FIGS. 5E and 5F) that is at or adjacent a proximal end of the chamber 1. One of both of these axes are parallel to the ground or work surface, and one or both of these axes can be inside the interior 16 of the chamber 1, or outside of the interior 16 of the chamber, for example distal to or proximal to the chamber 1. The rotation of the conveyor belt about the first axis is commonly 180° and the rotation about the second axis is commonly 180°, however in other embodiments it is possible for one of the axes to have a rotation of greater than 180° and the other of the axes to have a rotation of less than 180° (e.g., 360° minus the amount of rotation about the first axis). An example would be if the topside substantially linear sub-path 20 is parallel to the ground or work surface, and the underside return path 21 is not parallel to the ground or work surface. This configuration can be useful if the return path 21 is angled to make way for components (e.g., the motor 81, etc.) or to make room for other equipment.

In alternative embodiments, the chains 316, 318 can be replaced by cables, with the metal plates 328 hooked or otherwise coupled to the cables at each end of the metal plates 328. Though the conveyor belts are commonly run at a continuous speed, other protocols may be used, such as intermittent start/stop/start/etc. Or in some cases, the controller can be configured to cause the conveyor belt to move at an accelerating speed and/or a decelerating speed. This may be done in order to control the rate and which heat is added to an assembly or to control the rate of cooling, e.g., in some cases, without having to control changed in heater temperatures or other heater parameter (current, power, etc.).

Figure 23:
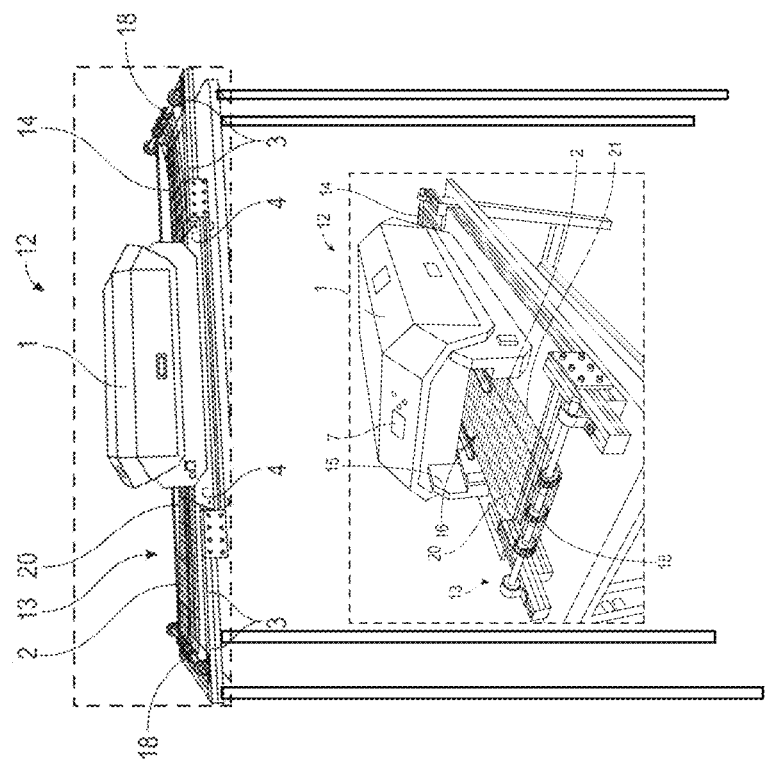
FIG. 23 is a perspective view of a production line comprising two heat processing systems, according to an embodiment of the present disclosure.

Multiple heat processing systems 12, 200, 210, 300 can be configured to allow an efficient production line. FIG. 23 illustrates such a production line comprising two heat processing systems/horizontal conveyorized heater systems 12. One has been set up at a higher elevation (enabled here by having longer table legs) than the other, and with either no angle or with an acute angle between the two horizontal feed/translation axes. Thus, a user can process materials on both at the same time, while being able to easily access each from a single standing position, or at least from a small area of the ground or floor, or on a chair or a rolling chair. In some embodiments, there are two or more, or three or more, or four or more, or five or more, or ten or more heat processing systems 12, 200, 210, 300 in a single production line. In some embodiments, some or all of the heat processing systems 12, 200, 210, 300 can be stacked or nested above and/or below each other, but two or more of them can have a small or no angle between their horizontal feed/translation axes. In other words, they can be substantially parallel and/or colinear to each other. In some embodiments, there can be two or more, three or more, four or more, or five or more levels of stacking/nesting. The height difference of the tops of the belts can be between about one-half foot and about ten feet, or between about one-half foot and about six feet. The multiple systems 12, 200, 210, 300 can each be a separate system configured together, or in alternative embodiments can be a single integrated system with multiple belts or tracks and/or multiple chambers.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

For purposes of the present disclosure and appended claims, the conjunction "or" is to be construed inclusively (e.g., "an apple or an orange" would be interpreted as "an apple, or an orange, or both"; e.g., "an apple, an orange, or an avocado" would be interpreted as "an apple, or an orange, or an avocado, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open-ended terminology, with the same meaning as if the phrase "at least" were appended after each instance thereof.

What is claimed is:

1. A machine for processing tubing comprising:
a chamber having an outer structure and an interior space;

a heater configured to add thermal energy to the interior space of the chamber;

a conveyor belt comprising twenty or more links, the conveyor belt having a width and configured to translate in a 360° path that includes a substantially linear sub-path that passes through the interior space of the chamber and that comprises a changing subset of the twenty or more links as the conveyor belt translates, each of the twenty or more links comprising a distal end and a proximal end, each of the twenty of more links pivotably coupled in relation to a distal adjacent link and in relation to a proximal adjacent link, wherein each of the twenty or more links is configured to rotate about an axis that is generally transverse to the 360° path, each of the twenty or more links further comprising a generally planar outer-facing surface extending from the distal end to the proximal end, such that, the generally planar outer-facing surface of each link of the substantially linear sub-path is adjacent to a generally planar outer-facing surface of at least one other link of the substantially linear sub-path, causing a generally planar composite surface to be maintained along the substantially linear sub-path as the conveyor belt translates in the 360° path; and wherein a first link of the twenty or more links comprises a first longitudinally-extending barricade adjacent a first side of the generally planar outer-facing surface of the first link and a second longitudinally-extending barricade adjacent a second side of the generally planar outer-facing surface of the first link, the first longitudinally-extending barricade of the first link transversely separated from the second longitudinally-extending barricade of the first link by a transverse distance that is less than one-half of the width of the conveyor belt, wherein a second link of the twenty or more links comprises a first longitudinally-extending barricade adjacent a first side of the generally planar outer-facing surface of the second link and a second longitudinally-extending barricade adjacent a second side of the generally planar outer-facing surface of the second link, the first longitudinally-extending barricade of the second link transversely separated from the second longitudinally-extending barricade of the second link by a transverse distance that is less than one-half of the width of the conveyor belt, and wherein when the conveyor belt is in a translated position such that the first link and the second link are both included in the changing subset of the twenty or more links of the substantially linear sub-path, a distance between the distal end of the first link and the proximal end of the second link is less than a total length of the substantially linear sub-path, such that an elongate member resting on and extending along the generally planar composite surface, between the first longitudinally-extending barricade and the second longitudinally-extending barricade of the first link of the twenty or more links and between the first longitudinally-extending barricade and the second longitudinally-extending barricade of the second link of the twenty or more links is transversely restricted from migrating more than one-half of the width of the conveyor belt.

2. The machine of claim 1, wherein the first longitudinally-extending barricade of the first link comprises a first vertical fin coupled to the first link, and wherein the first longitudinally-extending barricade of the second link comprises a second vertical fin coupled to the second link.

3. The machine of claim 2, wherein the second longitudinally-extending barricade of the first link comprises a third vertical fin coupled to the first link, and wherein the second longitudinally-extending barricade of the second link comprises a fourth vertical fin coupled to the second link.

4. The machine of claim 2, wherein the first vertical fin of the first link is attachable to and detachable from the first link and wherein the second vertical fin of the second link is attachable to and detachable from the second link.

5. The machine of claim 1, wherein the first longitudinally-extending barricade of the first link comprises a first angled wall of the first link, and wherein the first longitudinally-extending barricade of the second link comprises a first angled wall of the second link.

6. The machine of claim 5, wherein the second longitudinally-extending barricade of the first link comprises a second angled wall of the first link, and wherein the second longitudinally-extending barricade of the second link comprises a second angled wall of the second link.

7. The machine of claim 6, wherein the second angled wall of the first link is at an obtuse angle to the generally planar outer-facing surface of the first link, and wherein the second angled wall of the second link is at an obtuse angle to the generally planar outer-facing surface of the second link.

8. The machine of claim 7, wherein the first angled wall of the first link is at an obtuse angle to the generally planar outer-facing surface of the first link, and wherein the first angled wall of the second link is at an obtuse angle to the generally planar outer-facing surface of the second link.

9. The machine of claim 1, wherein the first link of the twenty or more links is longitudinally adjacent to the second link of the twenty or more links, and wherein the first link of the twenty or more links is not directly connected to the second link of the twenty or more links.

10. The machine of claim 1, further comprising a first flexible loop configured to circulate in a first substantially vertical plane and a second flexible loop configured to circulate in a second substantially vertical plane, wherein the first link is coupled to the first flexible loop at or adjacent a first side of the first link and is coupled to the second flexible loop at or adjacent a second side of the first link, and wherein the second link is coupled to the first flexible loop at or adjacent a first side of the second link and is coupled to the second flexible loop at or adjacent a second side of the second link.

11. The machine of claim 10, wherein the first flexible loop comprises a first chain.

12. The machine of claim 11, wherein the second flexible loop comprises a second chain, and wherein the first side of the first link, the second side of the first link, the first side of the second link, and the second side of the second link each have an end length that is less than a length between the distal end and the proximal end.

13. The machine of claim 12, wherein the end length is less than one-half of the length between the distal end and the proximal end.

14. The machine of claim 12, further comprising first, second, third, and fourth carrier plates configured, respectively, to couple the first side of the first link and the first side of the second link to the first flexible loop, and to couple the second side of the first link and the second side of the second link to the second flexible loop.

15. The machine of claim 11, further comprising a chain guide configured to support the first chain as it circulates.

16. The machine of claim 15, wherein the chain guide comprises a thermally insulative material configured to reduce the amount of conductive heat transfer from the chamber to the first chain.

17. The machine of claim 10, wherein the first flexible loop comprises a cable.

18. The machine of claim 1, wherein the generally planar outer-facing surface of the first link and the generally planar outer-facing surface of the second link each comprise a flat plate structure.

19. The machine of claim 18, wherein the flat plate structure of the generally planar outer-facing surface of the first link and the flat plate structure of the generally planar outer-facing surface of the second link each comprises a plurality of through holes.

20. The machine of claim 19, wherein the flat plate structure of the generally planar outer-facing surface of the first link comprises at least twelve through holes.

21. The machine of claim 18, wherein the first link and the second link each comprise stainless steel.

22. The machine of claim 1, wherein the distal end of each of the twenty or more links is rotatably coupled to a proximal end of a distal adjacent link at a first rotatable coupling, and wherein the proximal end of each of the twenty or more links is rotatably coupled to a distal end of a proximal adjacent link at a second rotatable coupling.

23. The machine of claim 1, wherein each of the twenty or more links is configured to rotate about a first axis that is at or adjacent a distal end of the chamber and to rotate about a second axis that is at or adjacent a proximal end of the chamber.

24. The machine of claim 23, wherein the rotation about the first axis is about 180° and wherein the rotation about the second axis is about 180°.

25. The machine of claim 1, wherein each of the twenty or more links comprises a tab at one of the distal end or the proximal end, and comprises a slit at the other of the distal end or the proximal end, the tab of a first one of the twenty or more links configured to be slidably coupled with the slit of an adjacent one of the twenty or more links.

26. The machine of claim 25, wherein the tab of each of the twenty or more links comprises an arc of at least 90°.

27. The machine of claim 1, further comprising an engagement portion disposed on the conveyor belt at or adjacent the generally planar composite surface, the engagement portion configured to engage a first elongate member to be processed within the interior space of the chamber such that translation of the conveyor belt in the 360° path causes the engagement portion, when engaged with the first elongate member, to move the first elongate member through the interior space of the chamber.

28. The machine of claim 27, wherein the engagement portion is configured to pull the first elongate member through the interior space of the chamber.

29. The machine of claim 27, further comprising an anchor having a first end and a second end, the first end configured to connect to the first elongate member and the second end having an anchoring portion, the anchoring portion configured to be releasably engaged with the engagement portion.

30. The system of claim 29, wherein the first end of the anchor comprises an internal lumen sized to be coupled to a first end of the first elongate member.

* * * * *